(12) United States Patent
Lee et al.

(10) Patent No.: US 12,526,241 B2
(45) Date of Patent: Jan. 13, 2026

(54) METHOD AND APPARATUS FOR QUANTUM COMPUTING BASED RESOURCE ALLOCATION IN WIRELESS COMMUNICATION SYSTEM

(71) Applicants: Samsung Electronics Co., Ltd., Suwon-si (KR); KOREA UNIVERSITY RESEARCH AND BUSINESS FOUNDATION, Seoul (KR)

(72) Inventors: Kwonjong Lee, Suwon-si (KR); Yujin Kang, Suwon-si (KR); Kwangseok Noh, Suwon-si (KR); Youngjin Seo, Suwon-si (KR); Jun Heo, Suwon-si (KR)

(73) Assignees: Samsung Electronics Co., Ltd., Suwon-si (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 656 days.

(21) Appl. No.: 17/825,390

(22) Filed: May 26, 2022

(65) Prior Publication Data

US 2022/0417168 A1 Dec. 29, 2022

(30) Foreign Application Priority Data

May 27, 2021 (KR) ........................ 10-2021-0068639

(51) Int. Cl.
*H04L 47/52* (2022.01)
*H04W 72/0446* (2023.01)
(Continued)

(52) U.S. Cl.
CPC ....... *H04L 47/527* (2013.01); *H04W 72/0446* (2013.01); *H04W 72/0453* (2013.01); *H04W 72/563* (2023.01)

(58) Field of Classification Search
CPC .............. H04L 47/527; H04W 72/563; H04W 72/0446; H04W 72/0453
See application file for complete search history.

(56) References Cited

U.S. PATENT DOCUMENTS

| | | | |
|---|---|---|---|
| 2004/0024750 A1* | 2/2004 | Ulyanov | ................ G06N 10/60 |
| 2015/0003426 A1 | 1/2015 | Lee et al. | |
| 2017/0286858 A1* | 10/2017 | La Cour | ................ G06N 10/80 |

FOREIGN PATENT DOCUMENTS

| | | |
|---|---|---|
| KR | 10-2010-0057187 A1 | 5/2010 |
| KR | 10-1311228 B1 | 9/2013 |
| WO | 2013/122306 A1 | 8/2013 |

OTHER PUBLICATIONS

Xuejia Cai and et. al., "A Graph-coloring based resource allocation algorithm for D2D communication in cellular networks", 2015 IEEE ICC (International Conference on Communication), pp. 5429-5434, Jun. 08-12, 2015 (Year: 2015).*

(Continued)

*Primary Examiner* — Kevin T Bates
*Assistant Examiner* — Jaeyoung Kwak
(74) *Attorney, Agent, or Firm* — Jefferson IP Law, LLP

(57) ABSTRACT

The disclosure relates to a 5G or 6G communication system for supporting a higher data transmission rate. A method performed by an apparatus of a wireless communication system is provided. The method includes receiving, from a base station, first information related to interference among a plurality of user equipments (UEs) that are to receive a resource allocation, second information related to a number of available resources, and third information related to a resource allocation reward associated with each of the (Continued)

plurality of user equipments (UEs), selecting a plurality of qubits based on the first information and the second information, and generating, based on the third information, resource allocation information derived from the plurality of qubits, where the resource allocation to the plurality of UEs is based on the resource allocation information.

14 Claims, 20 Drawing Sheets

(51) Int. Cl.
*H04W 72/0453* (2023.01)
*H04W 72/563* (2023.01)

(56) References Cited

OTHER PUBLICATIONS

Amit Saha and et. al., "Synthesis of Vertex Coloring Problem Using Grover's Algorithm", 2015 IEEE International Symposium on Nanoelectronic and Information Systems, pp. 101-106, Dec. 21-23, 2015 (Year: 2015).*

Yu-Shan Liang and et. al., "Resource Allocation with Interference Avoidance in OFDMA Femtocell Networks", IEEE Transactions on Vehicular Technology, pp. 2243 â 2255, vol. 61, No. 5, Jun. 2012 (Year: 2012).*

Xuejia Cai and et. al., "A Graph-coloring based resource allocation algorithm for D2D communication in cellular network", 2015 IEEE ICC, pp. 5429-5434, Jun. 8-12, 2015 (Year: 2015).*

Amit Saha and et. al. "Circuit Design for K-coloring Problem and its Implementation on Near-term Quantum Devices", 2020 IEEE International Symposium on Smart Electronic Systems (iSES) (Formerly iNiS), pp. 17-22, Dec. 14-16, 2020 (Year: 2020).*

Panagiotis Botsinis and et. al., "Noncoherent Quantum Multiple Symbol Differential Detection for Wireless Systems", IEEE Access: The Journal for rapid open access publishing, pp. 569-598, vol. 3, 2015 (Year: 2015).*

Amit Saha and et. al., "Synthesis of Vertex Coloring Problem Using Grover's Algorithm", 2015 IEEE International Symposium on Nanoelectronic and Information Systems, Dec. 21-23, 2015 (Year: 2015).*

Yu-shan Liang and et. al., "Resource Allocation with Interference Avoidance in OFDMA Femtocell Networks," IEEE Transactions on Vehicular Technology, vol. 61, No. 5, Jun. 2012 (Year: 2012).*

Grover, Lov K. "A fast quantum mechanical algorithm for database search.", Proceedings of the twenty-eighth annual ACM symposium on Theory of computing, pp. 212-219 (1996).

M. Boyer, G. Brassard, P. Hoyer, A. Tapp, "Tight Bounds on Quantum Searching", Phys. 46 4-5, 493-505 (1998).

Lin Zhang, Ming Xiao, Gang Wu, Muhammad Alam, Ying-Chang Liang, Shaoqian Li, "A Survey of Advanced Techniques for Spectrum Sharing in 5G Networks", IEEE Wireless Communications 17: 1536-1284 (2017).

Mostafa Zaman Chowdhury, Md. Shahjalal, Shakil Ahmed, Yeong Min Jang, "6G Wireless Communication Systems: Applications, Requirements, Technologies, Challenges, and Research Directions", IEEE Open Journal of the Communications Society, 1: 957-975 (2020).

Changhee Lee, Sung-Min Oh, Ae-Soon Park, "Interference Avoidance Resource Allocation for Device-to-Device Communication Based on Graph-Coloring", The Journal of Korean Institute of Communications and Information Sciences, 14-12 vol. 39A No. 12 (2014).

* cited by examiner

FIG. 7
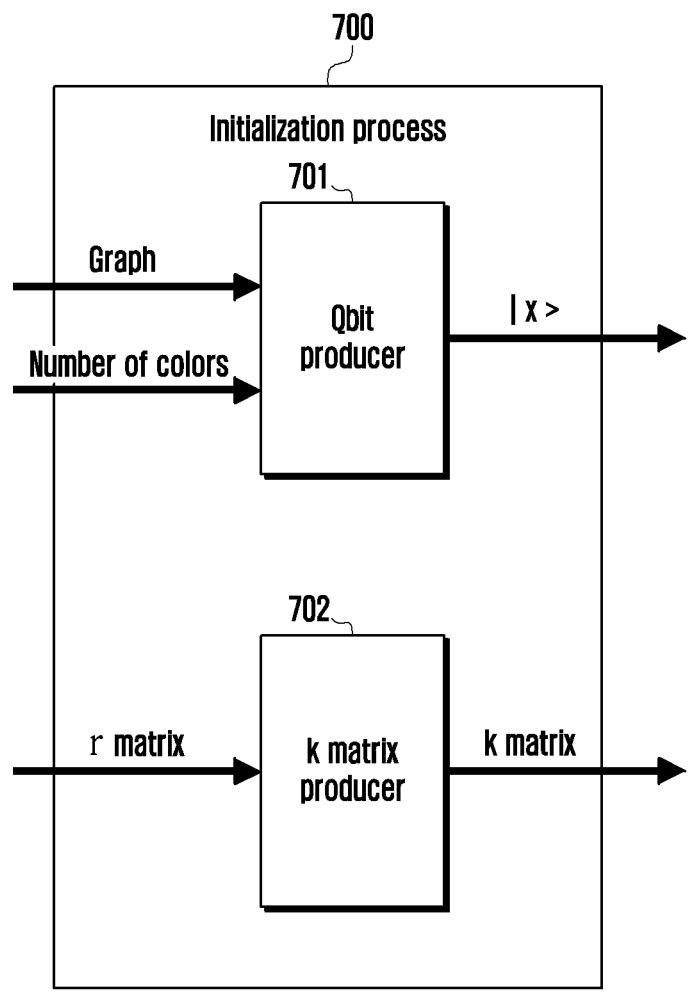
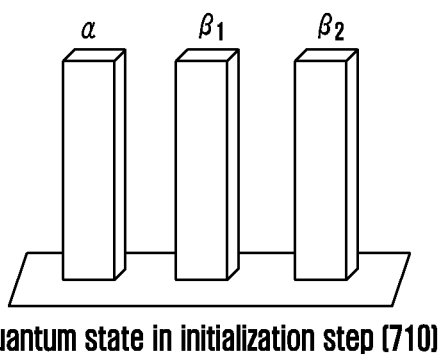
Quantum state in initialization step (710)

FIG. 8
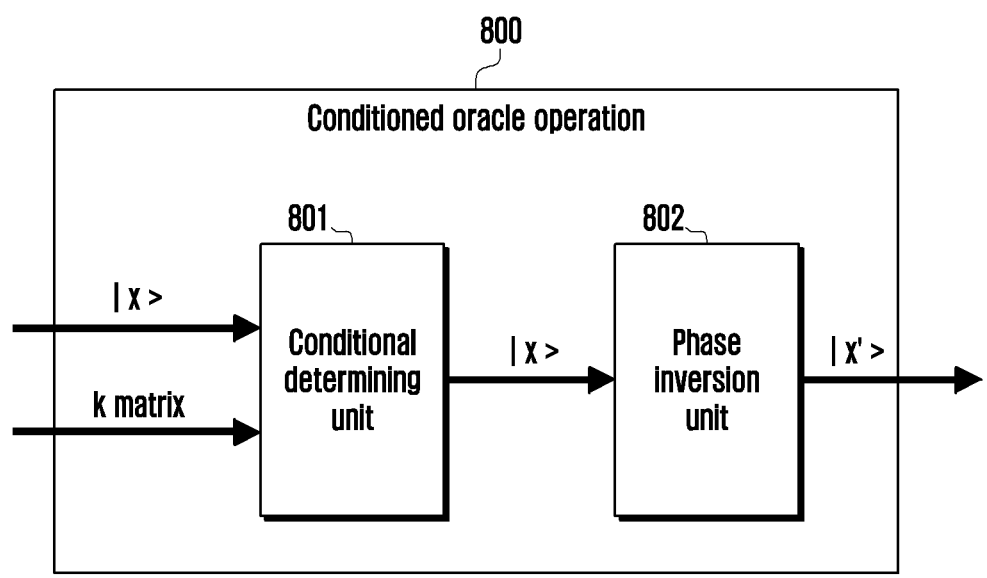
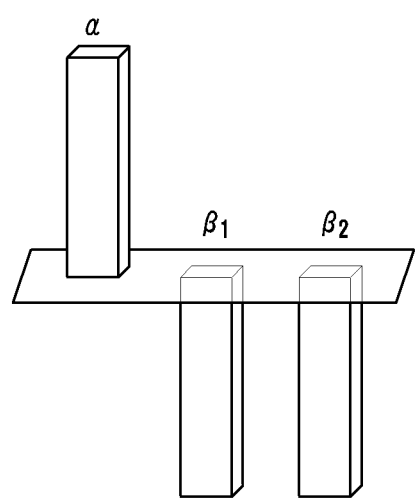
Case in which preference is not applied
(810)
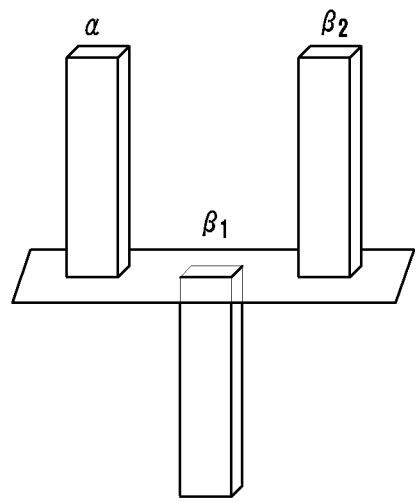
Case in which preference is applied
(820)

FIG. 9
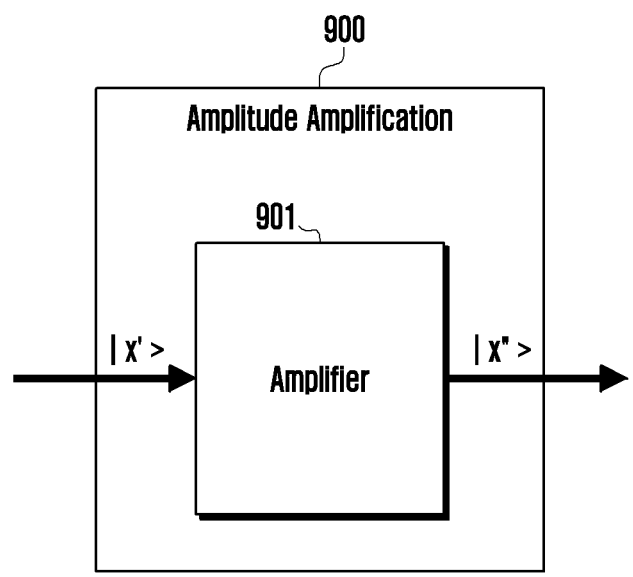
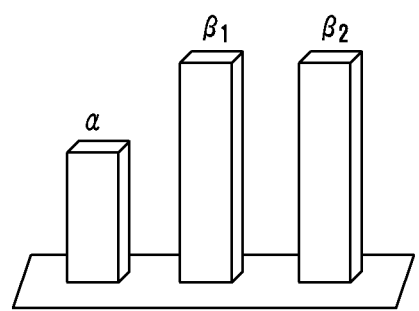
Case in which preference is not applied (910)
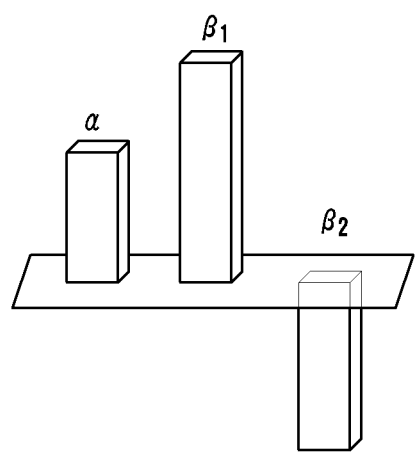
Case in which preference is applied (920)

FIG. 10
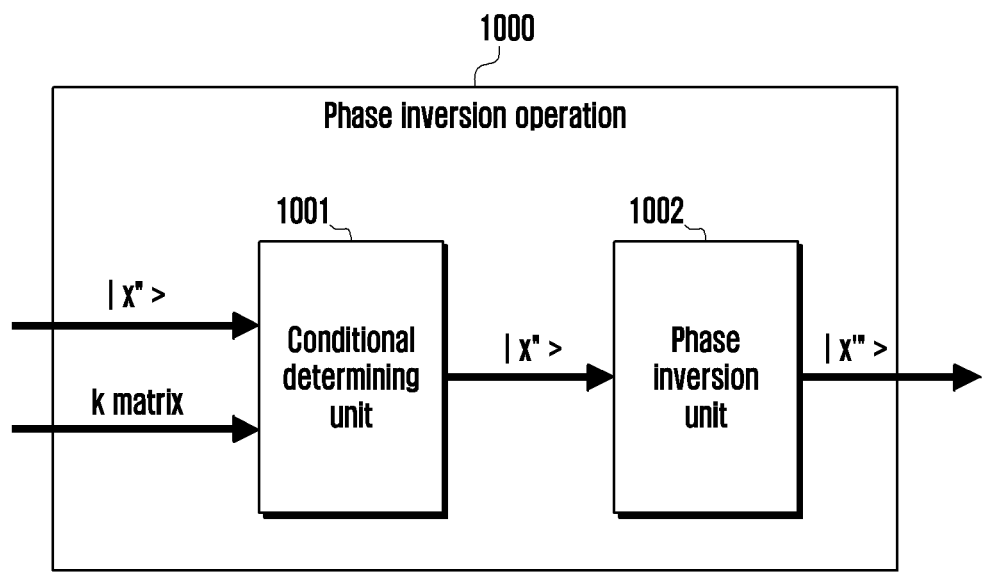
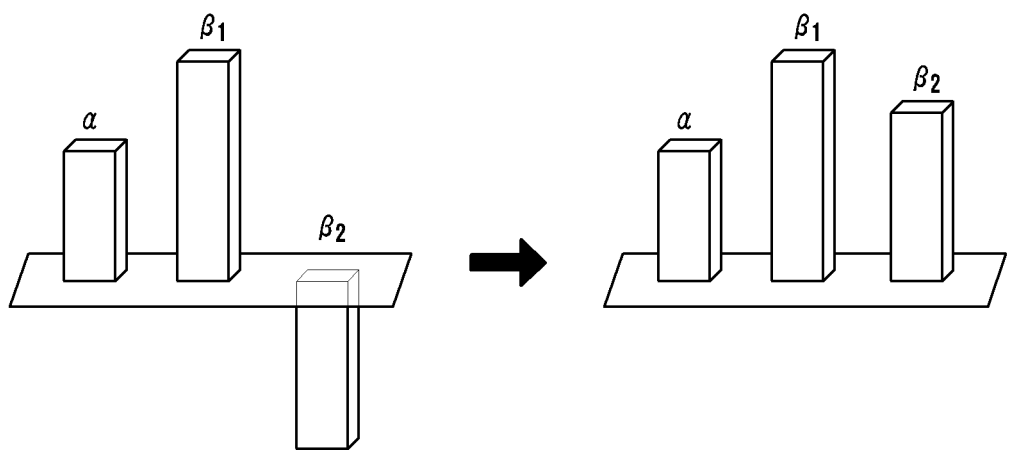
Quantum state before phase inversion operation (1010)    Quantum state after phase inversion operation (1020)

METHOD AND APPARATUS FOR QUANTUM COMPUTING BASED RESOURCE ALLOCATION IN WIRELESS COMMUNICATION SYSTEM

CROSS-REFERENCE TO RELATED APPLICATION(S)

This application is based on and claims priority under 35 U.S.C. § 119 (a) of a Korean patent application number 10-2021-0068639, filed on May 27, 2021, in the Korean Intellectual Property Office, the disclosure of which is incorporated by reference herein in its entirety.

Joint Research Agreement

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD., and 2) KOREA UNIVERSITY RESEARCH AND BUSINESS FOUNDATION.

BACKGROUND

1. Field

The disclosure relates to a method and apparatus for efficiently sharing unused resources in a wireless communication network based on allocated resources.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Quantum computing is a new calculation scheme based on a quantum state, and has a feature different from an existing computer that uses digital information. A quantum algorithm is a detailed method of configuring a quantum circuit for solving a given problem in a quantum computer. A quantum state used for quantum computing is a vector existing in a mathematical complex space, is capable of being superposed, and is capable of calculating faster than an existing computing. For example, when searching for data from an unsorted database, the search may be performed a square number times faster than the random search in the existing computing.

In addition, looking back the process in which each generation radio communication has been developed continuously, technology for services for humans such as voice, multimedia, data, and the like have been developed. After commercialization of a 5th generation (5G) communication system, connected devices which tend to be explosively used are expected to be connected to a communication network. Examples of an object connected to a network may be a vehicle, a robot, a drone, home appliances, a display, a smart sensor installed in various infrastructures, a construction machine, factory equipment, or the like. A mobile device may be expected to evolve to various form factors such as augmented reality glasses, a virtual reality headset, a hologram device, and the like. In order to provide various services by connecting hundreds of billions of devices and objects in the 6th-generation (6G) era, effort is being made to develop an improved 6G communication system. For this reason, the 6G communication system is referred to as a beyond 5G system.

The maximum transmission speed in the 6G communication system which is expected to be realized in about 2030 is tera (i.e., 1,000 giga) bps, and a radio latency is expected to be 100 microseconds (usec). That is, in comparison with the 5G communication system, the transmission speed in the 6G communication system becomes 50 times faster and the radio latency may be reduced to one tenth.

In order to achieve such high data transmission speed and ultra-low latency, it is considered to implement the 6G communication system in a terahertz (THz) band (e.g., 95 gigahertz (GHz) to 3 terahertz (3THz) band). In the terahertz band, due to more severe pathloss and atmospheric absorption in comparison with a millimeter wave (mmWave) band employed in 5G, technology capable of securing a signal range, that is, coverage, may be considered to be more important. As main technologies for securing coverage, a radio frequency (RF) device, an antenna, a new waveform that is better than orthogonal frequency division multiplexing (OFDM) from the perspective of coverage, beamforming, and a multi-antenna transmission technology such as a massive multiple-input and multiple-output (MIMO), a full dimensional MIMO FD-MIMO), an array antenna, a large scale antenna, and the like. In addition, in order to increase the coverage of a terahertz band signal, new technologies are being discussed such as metamaterial-based lens and antenna, higher-dimensional space multiplexing technology using orbital angular momentum (OAM), a reconfigurable intelligent surface (RIS), and the like.

In order to increase efficiency of frequencies and to improve a system network, full duplex technology that enables an uplink and a downlink to simultaneously utilize the same frequency resource, network technology that utilizes a satellite and high-altitude platform stations (HAPS), and the like in an integrated manner, network structure innovation technology that supports a mobile base station and the like, and enables optimization, automation, and the like of the operation of a network, dynamic spectrum sharing technology that avoids confliction based on the expectation of usage of a spectrum, artificial intelligence (AI)-based communication technology that implements the optimization of a system by utilizing AI from the step of designing, and internalizing an end-to-end AI support function, next generation distributed computing technology that implements a service with complexity beyond the limitation of UE operation capability by utilizing ultra-high performance communication and computing resource (mobile edge computing (MEC), cloud, and the like), and the like are being developed for the 6G communication system. In addition, via designing a new protocol to be used in the 6G communication system, implementation of hardware-based security environment, development of a mechanism for safely utilizing data, and development of technology related to a method of maintaining privacy, the connectivity between devices is strengthened, a network is further optimized, provision of a network entity in the form of software is accelerated, and increasing of openness of radio communication is continuously attempted.

It is expected that study and development of the 6G communication system may enable the new hyper-connected experience via the hyper-connectivity of the 6G communication system including the connection between a person and an object, in addition to the connection between objects. Particularly, it is predicted that the 6G communication system is capable of providing services such as truly immersive extended reality (XR), high-fidelity mobile hologram, digital replica, and the like. In addition, services such as a remote surgery performed based on increased security and reliability, industrial automation, and emergency response are provided via the 6G communication system and thus, may be applicable in various fields such as industry, medical treatment, vehicles, electronic appliances, and the like.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a proposed quantum algorithm taking into consideration a preference when performing resource allocation in a communication network. Resource allocation problems may be, for example, unused band allocation in a spectrum sharing scheme, communication resource allocation in inter-device direct communication (device-to-device (D2D) communication) system, scheduling number allocation of a transmission signal scheduling-related problem, and the like.

Additional aspects will be set forth in part in the description which follows and, in part, will be apparent from the description, or may be learned by practice of the presented embodiments.

In accordance with an aspect of the disclosure, a method performed by an apparatus of a wireless communication system is provided. The method includes receiving, from a base station, first information related to interference among a plurality of user equipments (UEs) that are to receive a resource allocation, second information related to a number of available resources, and third information related to a resource allocation reward associated with each of the plurality of UEs, selecting a plurality of qubits based on the first information and the second information, and generating, based on the third information, resource allocation information derived from the plurality of qubits, where the resource allocation to the plurality of UEs is based on the resource allocation information.

In accordance with another aspect of the disclosure, an apparatus of a wireless communication system is provided. The apparatus includes a transceiver and a controller. The controller is configured to receive, from a base station via the transceiver, first information related to interference among a plurality of UEs that are to receive a resource allocation, second information related to a number of available resources, and third information related to a resource allocation reward associated with each of the plurality of UEs, select a plurality of qubits based on the first information and the second information, and generate resource allocation information derived from the plurality of qubits based on the third information, where the resource allocation to the plurality of UEs is based on the resource allocation information.

According to an embodiment of the disclosure, the solution of a graph coloring problem (GCP) that reflects a preference may be obtained using a quantum calculating center.

In addition, according to an embodiment of the disclosure, a reward may be increased by operating a quantum algorithm capable of applying a preference.

In addition, according to an embodiment of the disclosure, in the process of achieving the solution of a GCP by applying a preference, the value may be obtained with complex that is a square number times lower than a classical algorithm method that obtains a value by searching for all values.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating a quantum state initialization process that is initially performed, when a quantum calculating center calculates the solution of a GCP using a quantum algorithm that applies a preference according to an embodiment of the disclosure;

FIG. 8 is a diagram illustrating a conditioned oracle operation process, when a quantum calculating center calculates the solution of a GCP using a quantum algorithm that applies a preference according to an embodiment of the disclosure;

FIG. 9 is a diagram illustrating an amplitude amplification operation process, when a quantum calculating center calculates the solution of a GCP using a quantum algorithm that applies a preference according to an embodiment of the disclosure;

FIG. 10 is a diagram illustrating a phase inversion operation process, when a quantum calculating center calculates the solution of a GCP using a quantum algorithm that applies a preference according to an embodiment of the disclosure;

Throughout the drawings, it should be noted that like reference numbers are used to depict the same or similar elements, features, and structures.

DETAILED DESCRIPTION

Figure 1:
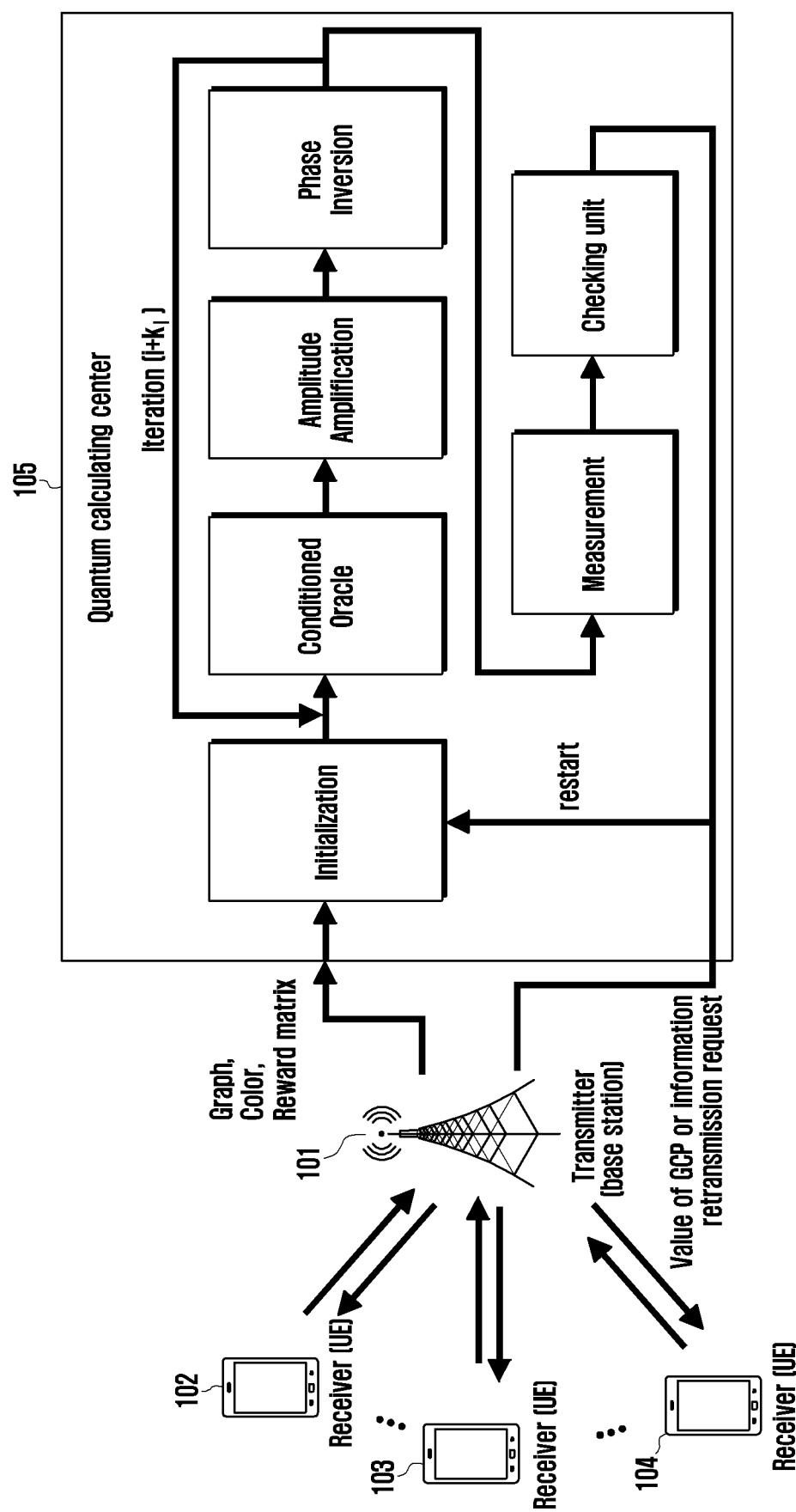
FIG. 1 is a diagram illustrating the architecture of the overall operation according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In a quantum computing, a quantum algorithm that solves a problem associated with searching for a specific data in an unsorted database may include a quantum search algorithm (or Grover algorithm, hereinafter referred to as "quantum search algorithm (QSA)"). QSA may utilize the characteristic of a quantum state, and may solve a problem a square number times faster than a random search scheme.

The scheme of the QSA superposes quantum states of which the number is greater than or equal to the data size of the unsorted database, selects only the specific data that is desired to be retrieved and inverts a phase using an oracle. The scheme increases the possibility of the specific data of which the phase is inverted, and iteratively performs the phase inversion and the process of increasing the possibility, so as to increase the possibility of measuring the specific data. The QSA is a quantum algorithm that measures a quantum state of which the possibility of specific data is increased, and detects the data.

The specific data exists as a superposed quantum state and thus, it is impossible to actually identify the same from the outside without performing measurement. The reason is associated with a quantum characteristic which is a quantum state collapses into a specific quantum state according to the possibility of each quantum state of the superposed quantum state at the point in time of measurement. That is, the phase of the specific data desired to be retrieved via an oracle may be inverted, but information associated with the desired data may not be known, and thus, the data desired to be retrieved may be obtained by increasing a possibility.

When the QSA increases the possibility of the specific data desired to be retrieved, the number of times that phase inversion and the process of increasing a possibility are iterated is connected directly to the complexity of an algorithm. The number of times that an algorithm is iteratively performed may be changed based on the data size of the unsorted database. In the case in which the data size of the unsorted database is N, a quantum algorithm may have an iteration complexity of $O(\sqrt{N})$. In the case of performing random search in existing computing, it has a complexity of $O(N)$, and thus, the speed may be a square number times slower than that of the QSA.

In succession to 5G, research on technology that efficiently allocates a limited resource, such as an adjacent band allocation of carrier aggregation (CA), spectrum sharing, a scheduling scheme, and the like, is continuously being conducted in the 6G network. The point of the corresponding technology is to define a target (object) to which allocation is to be performed, a usable resource, and a reward (throughput or the like in a band) that may be obtained when each resource is used, and to allocate a resource in a manner of preventing interference between adjacent objects.

A focused scheme in the disclosure describes and solves a resource allocation problem based on graph theory, and the scheme is based on a scheme of substituting the corresponding problem with a graph coloring problem (hereinafter referred to as a "GCP"), and calculating a value using a search algorithm.

The GCP is a problem that colors all vertexes with one color, and necessarily colors vertexes connected with an edge with different colors in a diagram in which a plurality of vertexes are connected with edges. In this instance, the number of usable colors may be determined in advance, and the problem may be extended to a problem that has a reward (gain) different depending on a color used for each vertex.

Therefore, in the case in which the elements of the resource allocation problem respectively correspond to the elements of the GCP as shown in Table 1, the corresponding problem may be substituted with the GCP, and the optimal resource allocation combination may be obtained by searching for the value of the GCP (or a color allocation combination). In the disclosure, substituting a resource allocation problem with a GCP is for ease of description and understanding, and means that a search algorithm of the GCP is used to solve the resource allocation problem, but the scope of the disclosure is not limited to the dictionary definition of a word such as 'graph', 'coloring', or the like.

TABLE 1

| Elements of resource allocation problem | Description | Elements of GCP |
| --- | --- | --- |
| Communication unit, $u_m$ | $m^{th}$ resource allocation object (UE, base station) | — |
| Communication link, $l_i$ | In the case in which a pair of objects $u_n$ and $u_m$ perform transmission or reception in $i^{th}$ link $l_i = (u_n, u_m)$ | Vertex, $v_i$ |
| Available resource, $s_p$ | $p^{th}$ available resource | Color, $c_p$ |
| Interference between adjacent objects, $f_i(i, j, q)$ | In the case of $s_p$, index indicating whether interference between $l_i = (u_n, u_m)$ and $l_j = (u_x, u_t)$ is present. In the case of using $s_p$, when one or more of the units of $l_i$ interferes with a unit of $l_j$, $l_i$ and $l_j$ interfere with each other $f_i(i, j, p) = \begin{cases} 1, & \text{if } l_i \text{ and } l_j \text{ interfere on } s_p \\ 0, & \text{otherwise} \end{cases}$ | Edge, $(v_i, v_j)$ |
| Resource usage reward (gain), $r_{i,p}$ | Reward (gain) when resource $s_p$ is used in $l_i$ (e.g.,: band throughput, Channel Quality Indication (CQI) or the like) | Reward, $r_{i,p}$ |

The process of deriving the solution of a GCP may need a search algorithm that is capable of identifying whether vertexes are connected. The QSA may perform phase inversion on data corresponding to a condition using an oracle and may display the same, and may detect the corresponding data with a repetition complexity of $O(\sqrt{N})$.

The process of solving the GCP using the QSA may be briefly described as a total of 5 steps. The 5 steps may be a quantum state initialization step, an oracle step, an amplitude amplification step, an iteration step, and a measurement step.

The quantum state initialization step allocates a Qubit capable of marks a color allocated for each of all vertexes in a single state. For example, in the case in which the number of vertexes is $N_l$ and the number of usable colors is $N_c$, $N_l$ pair of $N_c$ bits indicating the color to be used for each vertex are present and thus, a total of $N_l \times N_c$ qubits in the $|0\rangle$ state may be allocated. The qubit in the $|0\rangle$ state may correspond to a superposed quantum state in which allocation combinations that do not take into consideration connection are all superposed using a Hadamard gate. For example, in the case in which the number of vertexes is 3, and the number of available colors is 2, a total of 6 qubits may be allocated. For example, the quantum state that marks a first color, a second color, and the first color with respect to vertex 1, vertex 2, and vertex 3, respectively, may be expressed as [10 01 10).

The oracle step identifies whether vertexes are connected and displays a state that may be the value of the GCP. The quantum state displayed in the oracle step may be a quantum state of which the phase is inverted via a phase inversion operation. In this instance, a quantum state of which the phase is actually inverted is incapable of being identified and the number of inverted quantum states is also incapable of being identified.

The amplitude amplification step performs a Hadamard gate operation and an operation that inverts the phase of the $|0\rangle$ state, and then performs the Hadamard gate operation again so as to increase the possibility of a quantum state displayed in the oracle step.

The iteration step iteratively performs the oracle step and the amplitude amplification step, so as to iteratively increase the possibility of a quantum state of which the possibility is increased.

The measurement step measures a quantum state obtained via the iteration step, and obtains the index of the measured quantum state according to a possibility. The maximum value (index) obtained by measuring a quantum state may be changed into classical information (bit), and may be utilized equivalently to a value obtained by a classical algorithm. In the case in which a GCP is calculated using the QSA, the final value (index) may be obtained as a color that is capable of being used for each vertex. For example, in the case in which the number of the vertexes is 3, and the number of usable colors is 2, (it is assumed that the possibility of a quantum state that is the value obtained by sufficiently performing iteration in the iteration step is '1' for ease of description.) If the maximum value (index) obtained in the measurement step is 10 01 10, this may mean that the finally measured quantum state is |10 00 10), and may allocate a first color, a second color, and the first color with respect to vertexes 1, 2, and 3, respectively.

After the measurement step, in the case in which the obtained final value (index) is determined as a 'wrong answer' that does not satisfy the condition of the GCP, an algorithm may reperform. In this instance, the iteration step may increase the number of times that iteration is performed and may reperform the algorithm. For example, the number of times of iterations may be increased via a Boyer-Brassard-Hø (BBHT) algorithm.

The number of states desired to be measured may be more than one, and a plurality of values may be amplified to have the same possibility. Therefore, in the case of solving a GCP using a normal QSA, the possibility of measuring all the solutions of the GCP may be amplified, and all the values may be detected with the possibility in the case of measurement. In this instance, the scheme does not take into consideration the reward (gain) of each solution of GCP, and has the same possibility. Accordingly, in the case in which the scheme is extended to a GCP that takes into consideration a reward (gain), the scheme may not act as an optimal algorithm.

An aspect of the disclosure is to provide a proposed quantum algorithm that applies a preference when performing resource allocation in a communication network. Resource allocation problems may be, for example, unused band allocation in a spectrum sharing scheme, communication resource allocation in inter-device direct communication (device-to-device (D2D) communication) system, scheduling number allocation in a transmission signal scheduling, and the like.

In the disclosure, a preference may be a reward (gain) that an object that receives each resource allocated may have, or a degree of request for a resource to be allocated. In this instance, the reward (gain) may be the maximum bandwidth, throughput, or the like that an object (a UE) that receives a resource allocated is capable of obtaining when using a resource spectrum. According to the normal QSA method, the reward (gain) may not be applied in the case of resource allocation. The algorithm provided in the disclosure applies the reward (gain) in the case of resource allocation, so that resource allocation may be performed to have a higher reward (gain) in comparison with a communication network. The degree of request for a resource to be allocated may be the degree of preference for a predetermined resource by objects that provide information in a resource allocation process, determine and make decision, such as a base station or a UE in the communication system, and the degree of request may be connected to a reward (gain). For example, in the case in which the degree of request for a predetermined resource is high, the algorithm may significantly increase a reward (gain) for the corresponding resource of the corresponding object. Therefore, for ease of description, description will be provided from the perspective of a reward (gain).

In the case in which it is assumed that a problem of allocating a limited resource in a communication network is substituted with a GCP, the disclosure provides a method of solving the GCP that applies a preference in consideration of a reward (gain) that may be obtained when a resource is allocated, using a quantum algorithm.

A resource allocation problem mentioned in the disclosure may be substituted with a GCP. Conditions required for substituting the problem with the GCP may include the following three items.

1. Mark adjacent vertexes with different colors
2. The number of usable colors for each vertex is determined in advance
3. A reward (gain) is different for each vertex depending on a color used The disclosure is to obtain a value that enables a reward (gain) to be the maximum value according to a required condition.

In addition, when allocating a limited resource in a communication network, the disclosure may take into consideration only some users that newly need resource allocation, without taking into consideration the entire system, and may configure a graph excluding a user who already receives a resource allocated. Alternatively, in the case in which new resource allocation is needed in order to increase a reward (gain) from the perspective of the entire system, new resource allocation may also be applied to a user who already receives a resource allocated. That is, the resource allocation process may be periodically performed for the entire resource, or may be periodically/aperiodically performed by request of a UE that needs resource allocation or based on determination by a base station.

The disclosure introduces a concept of a quantum calculating center (or a quantum calculating device, hereinafter they are interchangeably used) that performs quantum computation using a quantum algorithm. It is assumed that computing technology that operates a quantum algorithm is capable of operating a quantum algorithm in a logical qubit operation. In addition, it is assumed that a logical qubit does not collapse while the entire quantum algorithm is operated, and all qubits are capable of performing a 2-qubit operation or more. The quantum calculating center may be configured as a separate physical entity in a communication network system, or may be included in a base station.

The disclosure provides a new quantum algorithm scheme that applies a preference by solving a problem that is incapable of applying a preference for a solution in a normal QSA. The oracle operation process in the normal QSA process proposed in the disclosure may be substituted with a conditioned oracle operation process, and a phase inversion operation process may be added. In order to apply a preference for each qubit, a preference matrix may be needed as input information of an algorithm.

Hereinafter, embodiments of the disclosure will be described in detail with reference to the accompanying drawings. Further, in the following description of the disclosure, a detailed description of known functions and configurations incorporated herein will be omitted when it may make the subject matter of the disclosure rather unclear. The terms which will be described below are terms defined in consideration of the functions in the disclosure, and may be changed according to users, intentions of the users, customs, or the like. Therefore, the definitions of the terms should be made based on the contents throughout the specification.

FIG. 1 is a diagram illustrating the architecture of the overall operation according to an embodiment of the disclosure.

Referring to FIG. 1, in the case in which a problem that allocates a limited resource in a communication network is capable of being substituted to a GCP, a transmitter (base station) 101 may transmit, to the quantum calculating center 105, a graph, color information, and reward matrix information for applying a preference produced based on information received from a receiver (UE) 102 to 104. The quantum calculating center 105 may operate a quantum algorithm that applies a preference, so as to finally transmit the value of the GCP or to request retransmission of information.

Figure 2:
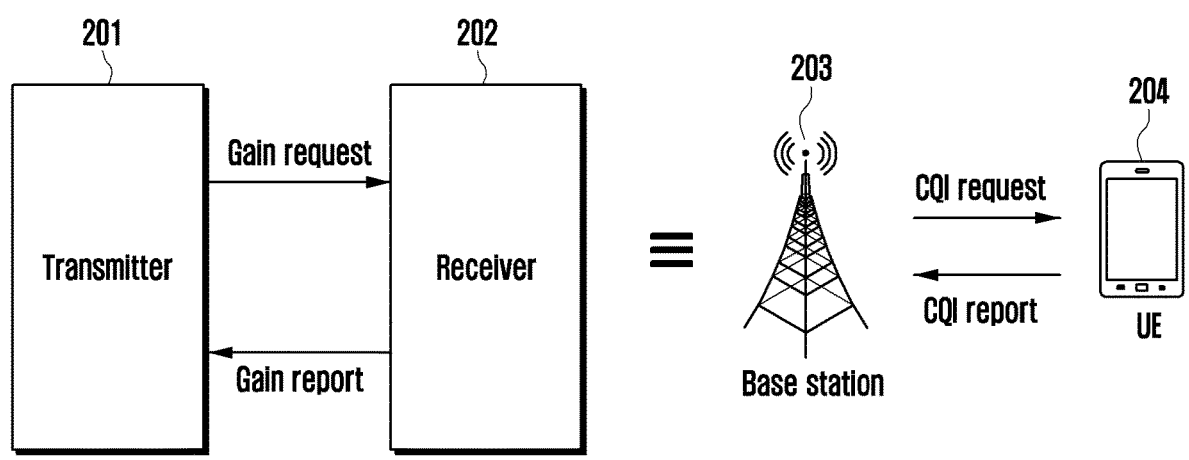
FIG. 2 is a diagram illustrating a process in which, when allocating a limited resource in a communication network, transmitter requests a reward (gain) capable of being obtained by allocating a resource to a receiver and receives a report according to an embodiment of the disclosure.

FIG. 2 is a diagram illustrating a process in which, when allocating a limited resource in a communication network, a transmitter requests a reward (gain) capable of being obtained by allocating a resource to a receiver and receives a report according to an embodiment of the disclosure.

Referring to FIG. 2, a transmitter 201 and a receiver 202 may be a base station 203 and a UE 204 in a communication system, respectively, and a combination of values such as a CQI, a rank index, or the like may be used as a reward (gain). For example, in the communication system, the base station 203 may transmit a signal that requests a channel quality indication (CQI) value to the UE 204, and the UE 204 may report a CQI value to the base station 203. Alternatively, the UE 204 may periodically report a CQI, without a request for a CQI from the base station.

The CQI may be expressed as 4bits (0 to 15) by classifying a target block error rate (BLER) as 16 values as shown in Table 2, and the UE 204 may report the same to the base station 203. Table 2 is some tables of a plurality of CQI tables included in 3GPP TS38.214. Although the disclosure shows a CQI table of Table 2, a CQI table that is capable of being used as a reward (gain) is not limited to Table 2, and a CQI table included in 3GPP TS38.214 may also be used.

TABLE 2

| CQI index | Modulation | Code rate 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

A communication system of FIG. 2 illustrates, as an example, a dynamic spectrum management (DSM) scheme that allocates an unused band that a primary user does not use in a CR network to a cognitive user, satisfies the interference condition of a network, and maximizes an allocation reward (gain). For example, a cognitive base station (base station) (hereinafter referred to as a "cognitive BS") is the transmitter 201 and requests a CQI value from a cognitive user that is the receiver 202, or the cognitive user periodically reports a CQI value to a cognitive BS.

In order to report a reward (gain), information used in a normal communication method such as a CQI may be used as it is, but only a part of the corresponding information may be used according to a user's request. For example, a CQI may be used by lowering a level to 2 bits.

Alternatively, for example, as a value that the UE 204 reports to the base station 203, the UE 204 may use a signal (hereinafter, referred to as a resource designating signal) including a 1-bit signal indicating that the UE 204 desires to maintain a currently used resource, as opposed to using an existing signal such as a CQI, an RI, or the like. For example, in the case in which the UE needs to perform a continuous operation according to a corresponding resource, the UE may transmit a 1-bit signal that is a request for using the corresponding resource continuously.

Figure 3:
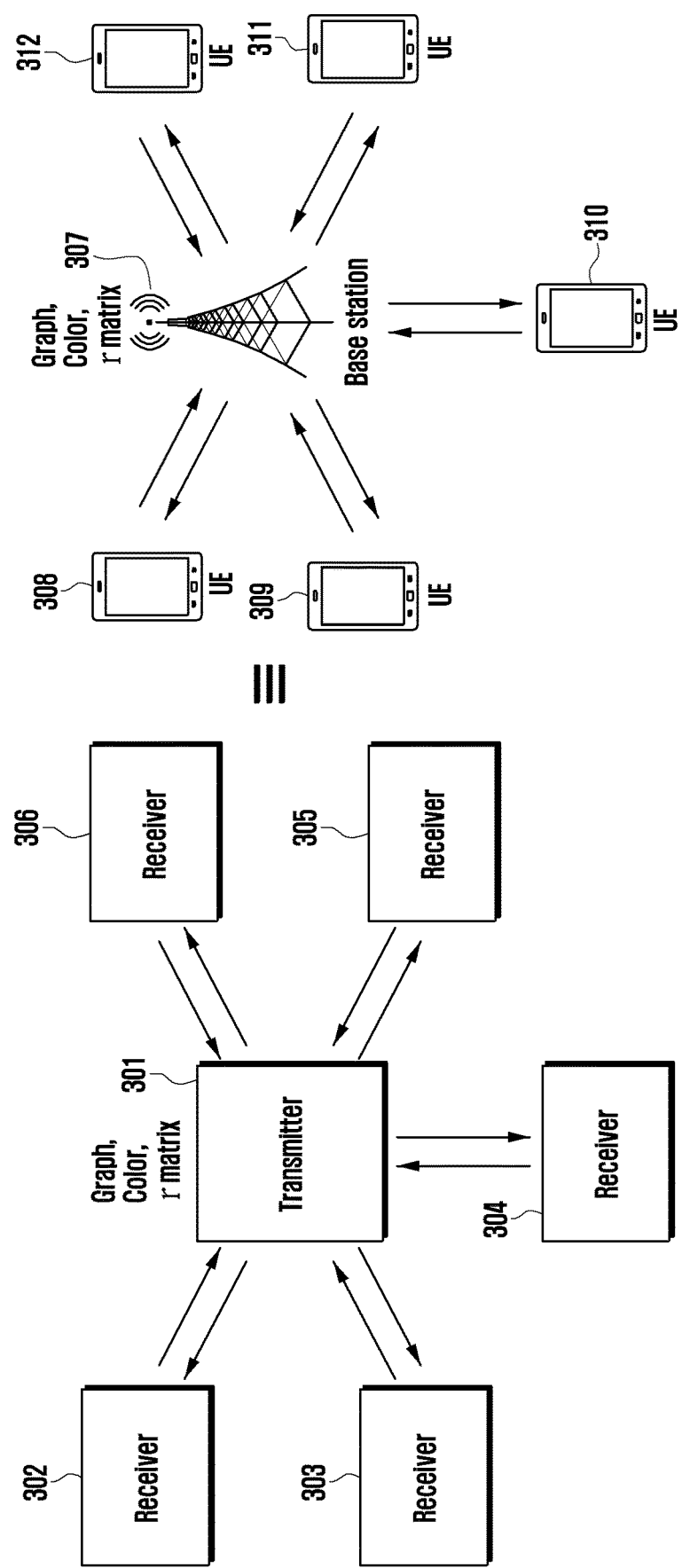
FIG. 3 is a diagram illustrating an operation in which, when allocating a limited resource in a communication network, a transmitter receives information for resource allocation from a plurality of receivers according to an embodiment of the disclosure.

FIG. 3 is a diagram illustrating an operation in which, when allocating a limited resource in a communication network, a transmitter receives information for resource allocation from a plurality of receivers according to an embodiment of the disclosure.

Referring to FIG. 3, a transmitter 301 may produce graph information based on an object to which allocation is to be performed and information associated with the existence of interference, and may produce color information based on information associated with an allocable resource. In addition, the transmitter 301 may also receive a reward (gain) value from the receivers 302 to 306, and may produce a reward matrix r associated with each receiver 302 to 306 based on the received reward (gain) value. The produced graph, the number of colors, and the reward matrix r may be used as information to be transmitted to the quantum calculating center, later on.

The reward (gain) value that the transmitter 301 receives may be in a polynomial increase relationship with the performance of the communication system, and the reward (gain) value may be in the range of all real numbers. In the case in which the range of a reward (gain) value transmitted from each of the receivers 302 to 306 is different, the transmitter 301 may adjust the range of the reward (gain) value.

For example, in the case in which UEs 308 to 311 of FIG. 3 transmit CQI index values of 0 to 8 to a base station 307, and a UE 312 transmits CQI index values of 6 to 10 to the base station 307, the base station 307 may produce a reward matrix by adjusting the range of a reward (gain) value from the CQI index values of 6 to 10 received from the UE 312 to the CQI index values of 4 to 8, when producing a reward matrix.

In the case in which some receivers of FIG. 3 transmit reward (gain) values, a transmitter may perform an algorithm by making a reward matrix with respect to the corresponding receivers, or may perform an algorithm by configuring a reward matrix including a receiver that does not transmit a reward (gain) value. In this instance, with respect to the receiver that does not transmit a reward (gain), a previously used reward (gain) value may be used.

Alternatively, in the case in which a predetermined receiver transmits a resource designating signal, as opposed to a reward (gain) value, a reward (gain) value when the corresponding resource is maintained may be set to the maximum value or may be set to a slightly increased value, and a reward (gain) value when the corresponding resource is not maintained may be set to the minimum value or may be set to a slightly decreased value, in the reward matrix.

Figure 4:
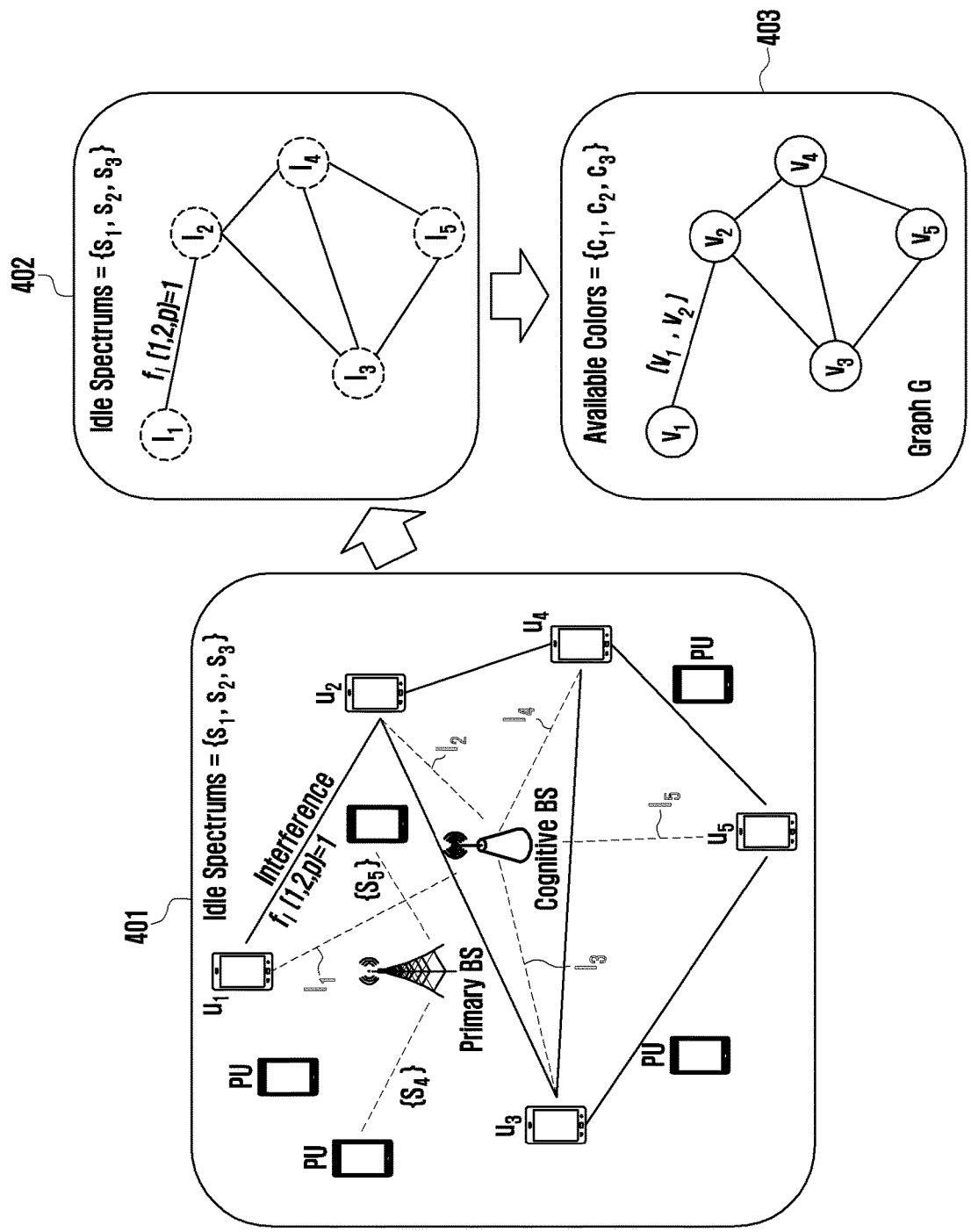
FIG. 4 is a diagram illustrating a process of converting a resource allocation problem into a GCP according to an embodiment of the disclosure.

FIG. 4 is a diagram illustrating a process of converting a resource allocation problem into a GCP according to an embodiment of the disclosure.

Referring to FIG. 4, the process of changing a resource allocation problem into a GCP may be performed in order of an operation 401 of searching for a previously allocable resource, an operation 402 of identifying an object to which allocation is to be performed and interference is present, and an operation 403 of converting to a graph. For example, a CR network searches for a band $\{s_1, s_2, s_3\}$ that a primary user (PU) does not temporarily use, and may define the same as an allocable resource. This is to recognize the number of usable colors in the above-described GCP condition. The case in which communication units perform transmission or reception is marked with a broken line, and a solid line indicates that interference may occur between communication units. In FIG. 4, a single communication link receives a single spectrum allocated, and thus, may correspond to the vertex of a graph. Whether adjacent communication links interfere with each other (solid line) may be substituted with an edge between vertexes so that different resources may be allocated. Therefore, a final graph may be provided in a form reflecting an object to which a resource is to be allocated and whether interference is present.

Figure 5:
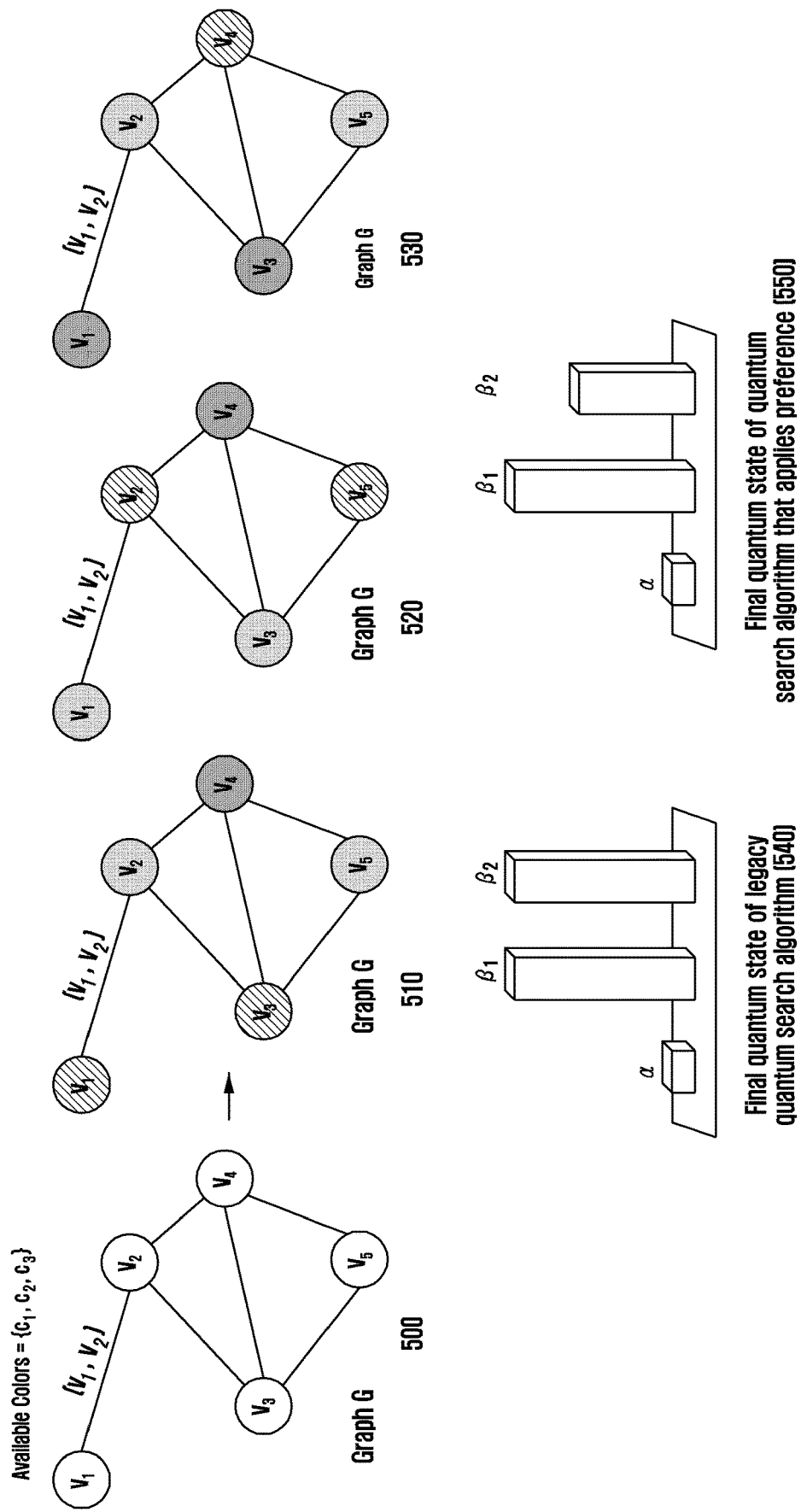
FIG. 5 is a diagram illustrating the solution of a GCP and a final quantum state obtained as a result of operating a quantum search algorithm when a resource allocation problem is changed into a GCP according to an embodiment of the disclosure.

FIG. 5 is a diagram illustrating the solution of a GCP and a final quantum state obtained as a result of operating a quantum search algorithm when a resource allocation problem is changed into a GCP according to an embodiment of the disclosure.

Referring to FIG. 5, diagram 500 in which a resource allocation problem is changed to a GCP is illustrated. A set $\{s_1, s_2, s_3\}$ of resources available in the CR network may correspond to colors Available Colors=$\{c_1, c_2, c_3\}$ available in the GCP. In addition, objects (e.g., UEs) to receive resources allocated may correspond to a plurality of vertexes $v_1, v_2, \ldots, v_5$ of the GCP, and an interference situation where adjacent objects interfere with each other may correspond to an edge that connects corresponding vertexes. Here, the cases in which all vertexes $v_1, v_2, \ldots, 15$ are marked with one of the Available Colors={$c_1, c_2, c_3$}, and vertexes connected via an edge are marked with different colors, may be the value of the GCP, and the solutions of the GCP may be derived using a quantum search algorithm (QSA). Subsequently, a resource may be allocated according to the obtained value of the GCP, so that objects to which the resources are allocated may not interfere with each other. Although three types of values 510, 520, and 530 of the GCP are illustrated in the drawing, a larger number of values may be obtained.

In the case of obtaining the value of the GCP using the quantum search algorithm, a quantum state that is not the value of the GCP may be referred to as a, and quantum states that are the solutions of the GCP may be referred to as $\beta_1$ and $\beta_2$. For example, in the case in which the quantum state of the value 510 of the GCP is $\beta_1$ and the quantum state of the value 520 of the GCP is $\beta_2$, it is assumed that the value 510 of the GCP has a higher preference than the value 520 of the GCP. That is, in the case in which a resource corresponding to the value 510 of the GCP is allocated, a reward (gain) may be higher than the case of allocating the resource corresponding to the value 520 of the GCP. In the case of solving the GCP using a normal QSA, all the solutions of the GCP may be amplified to have the same possibility as shown in diagram 540. Therefore, all the solutions of the GCP are detected with the same possibility, and the scheme is incapable of considering the preference for each value of the GCP. The disclosure provides a quantum search algorithm that applies a preference. According to the method of the disclosure, the quantum state $\beta_1$ of the value 510 of the GCP having a higher preference may be amplified to have a possibility higher than the quantum state $\beta2$ of the value 520 of the GCP as shown in diagram 550. Therefore, by using a quantum search algorithm that applies a preference according to the disclosure, the possibility that the value 510 of the GCP having a higher reward (gain) will be derived may be increased and improved communication efficiency may be expected in comparison with the normal method by allocating the resource according to the obtained value of the GCP.

Figure 6:
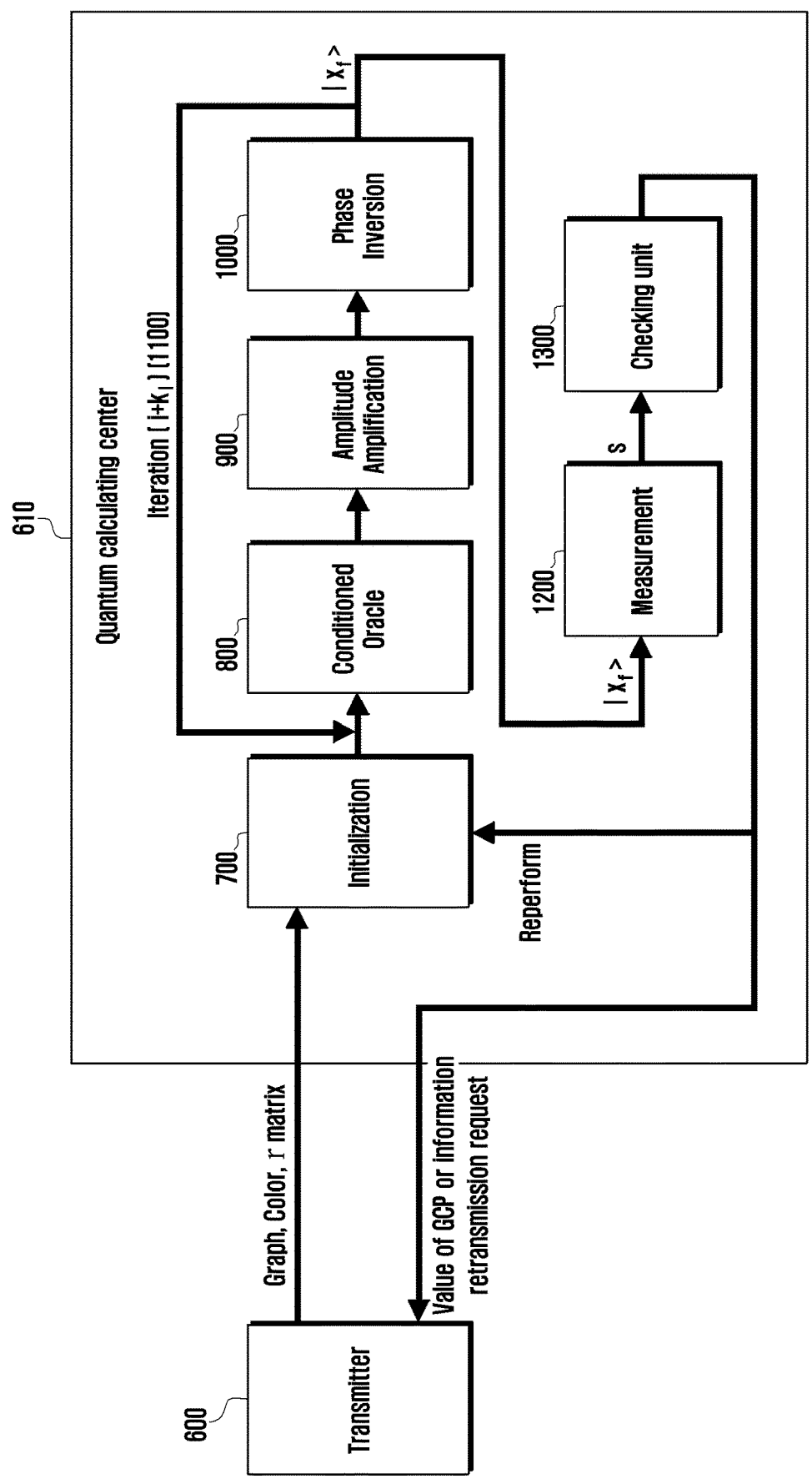
FIG. 6 is a diagram illustrating a process of calculating, by a quantum calculating center, the solution of a GCP using a quantum algorithm that applies a preference according to an embodiment of the disclosure.

FIG. 6 is a diagram illustrating a process of calculating, by a quantum calculating center, the solution of a GCP using a quantum algorithm that applies a preference according to an embodiment of the disclosure.

Referring to FIG. 6, a process is illustrated in which a transmitter 600 (or a base station, hereinafter they are interchangeably used) transmits information associated with a graph, a color, a reward matrix r to a quantum calculating center 610 (or a quantum calculating device, hereinafter they are interchangeably used), and receives a request for information associated with a value or a request for information retransmission, in the case in which a limited resource is allocated in a communication network.

The transmitter 600 may transmit a graph, the number of colors, and information associated with the reward matrix r to the quantum calculating center 610. In this instance, in the case in which the number of nodes (vertexes) of the graph transmitted from the transmitter 600 is $N_l$, and the number of colors is $N_c$, the reward matrix r may be $N_l \times N$ matrix. In this instance, the quantum calculating center 610 may be disposed in the transmitter 600, or may be located separately from the transmitter 600. As the reward matrix r transmitted from the quantum calculating center 610, a predetermined index value used for the performance such as a rank index (RI) in addition to a CQI value may be used. The quantum calculating center 610 may be gathered physically, or may be a logical gathering of devices capable of performing multiple quantum algorithms. In other words, that may be a gathering of devices provided in the form of being distributed physically.

The quantum calculating center 610 may obtain the value of the GCP using the quantum algorithm that applies a preference, and may transmit the obtained value to the transmitter 600. Alternatively, according to a predetermined condition, the quantum calculating center 610 may request retransmission of the graph, the color, the reward matrix r from the transmitter 600, or may operate the quantum algorithm again. Subsequently, the transmitter (base station) 600 may allocate a resource to the UE based on the value of the GCP (or available resource allocation information of a communication network that reflects a preference) received from the quantum calculating center 610.

Descriptions associated with detailed operations 700 to 1300 of a quantum algorithm that applies a preference performed in the quantum calculating center 610 provided in the disclosure will be described with reference to FIGS. 7 to 13.

FIG. 7 is a diagram illustrating a quantum state initialization process that is initially performed, when a quantum calculating center calculates the solution of a GCP using a quantum algorithm that applies a preference according to an embodiment of the disclosure.

Referring to FIG. 7, a qubit producer 701 may produce a quantum state |x⟩ based on a graph and color information received from a transmitter. The qubit producer 701 may initiate a quantum state to a quantum state |0⟩ having $N_l \cdot N_c$ qubits based on the number $N_l$ of nodes of the graph and the number $N_c$ of colors, and may use a Hadamard gate so as to produce a quantum state in which a total of $2^{Nl \cdot Nc}$ quantum states from the quantum state 0 to the quantum state $2^{Nl \cdot Nc}-1$ are superposed as shown in Equation 1.

$$|x\rangle = \frac{1}{\sqrt{2^{N_l \cdot N_c}}} \sum_0^{2^{N_l \cdot N_c}-1} |q\rangle \qquad \text{Equation 1}$$

For ease of description, referring to the example illustrated in FIG. 5, since $N_l$=5 and $N_3$=c, a total of 15 qubits are assigned as shown in Equation 2, and a quantum state in which a total of $2^{15}$ quantum states are superposed may be produced as shown in Equation 3.

$$|q_{11}q_{12}q_{13}q_{21}q_{22}q_{23}q_{31}q_{32}q_{33}q_{41}q_{42}q_{43}q_{51}q_{52}q_{53}\rangle = \qquad \text{Equation 2}$$
$$|000\ 000\ 000\ 000\ 000\rangle, \ldots, |001\ 010\ 001\ 100\ 010\rangle,$$
$$\ldots, |111\ 111\ 111\ 111\ 111\rangle$$

$$|x\rangle = \frac{1}{\sqrt{2^{15}}}|000\ 000\ 000\ 000\ 000\rangle + \qquad \text{Equation 3}$$
$$\ldots + \frac{1}{\sqrt{2^{15}}}|001\ 010\ 001\ 100\ 010\rangle +$$
$$\ldots + \frac{1}{\sqrt{2^{15}}}|111\ 111\ 111\ 111\ 111\rangle$$

Referring to FIG. 7, a r matrix may be converted into k matrix via a k matrix producer 702. The matrix elements $r_{pq}$(p=1 ... $N_l$, q=1 ... $N_c$) of the r matrix may be a preference for the corresponding color of each node (vertex). In other words, that may refer to a reward (gain) when an object (e.g., a UE) to which a resource is to be allocated in a communication system receives a corresponding resource allocated. In the example, the r matrix may be expressed, for example, as shown in Equation 4 as given below.

$$r = \begin{bmatrix} 6 & 1 & 7 \\ 3 & 4 & 8 \\ 2 & 9 & 5 \\ 8 & 4 & 4 \\ 1 & 9 & 1 \end{bmatrix} \quad \text{Equation 4}$$

The r matrix may be produced based on channel information (e.g., CQI) that a transmitter (base station) receives from a UE, or may be produced by a quantum calculating center based on information transferred from the transmitter (base station).

The process of converting from the r matrix to the k matrix may be performed from the process of converting from the r matrix to a r' matrix. The r matrix may be converted into the r' matrix by $f_{r'}$ (t) and a quantization level R. $\{f_{r'}$ (t)$\}$ and the quantization level R may be set in advance, and satisfy t=1, 2, . . . , R. In the r matrix, $r_{pq}$ corresponds to the closest a $f_{r'}$(t) value, and may be converted into $r_{pq}=f_{r'}$(t). For example, $r_{pq}$ may be calculated as shown in Equation 5 below.

$$r'_{pq} = f_{r'}\left(\operatorname*{argmin}_{t}|f_{r'}(t) - r_{pq}|\right) \quad \text{Equation 5}$$

For example, in the case in which it is assumed that quantization is performed based on R=3 and $\{f_{r'}(t)\}=\{2,5,8\}$, it is expressed that $f_{r'}(1)=2$, $f_{r'}(2)=5$, and $f_{r'}(3)=8$. Therefore, the r matrix used in Equation 4 may be converted into a r' matrix as shown in Equation 6.

$$r' = \begin{bmatrix} 5 & 2 & 8 \\ 2 & 5 & 8 \\ 2 & 8 & 5 \\ 8 & 5 & 5 \\ 2 & 8 & 2 \end{bmatrix} \quad \text{Equation 6}$$

Subsequently, the k matrix may be produced using the r' matrix obtained via the conversion. $k_{pq}$ in the k matrix may be determined to be $k_{pq}=t-1$ using t that satisfies $r_{pq}=f_r(t)$.

Referring to FIG. 7, based on the r matrix information received from the transmitter 501, the k matrix producer 702 may produce the k matrix capable of applying a preference for each qubit. The k matrix is NIX Ne matrix, and $k_{pq}$ is the number of iterations of an algorithm that applies a preference in the case in which a $p^{th}$ receiver uses a $q^{th}$ band. That is, in the case of $k_{pq}=3$, this indicates a quantum state when a $p^{th}$ receiver (e.g., a UE) uses a $q^{th}$ band in a superposed quantum state in which a total of $2^{N_l \cdot N_c}$ quantum states from a quantum state 0 to a quantum state $2^{N_l \cdot N_c}-1$ are superposed, and indicates that the number of times that preferences for quantum states included in the value of the GCP is applied is 3. Via application of a preference, the possibility of a quantum state that is an object for which a preference is to applied will be increased in the same manner that a possibility is increased via the oracle and amplitude amplification processes in the QSA. According to the example, k matrix may be expressed as shown in Equation 7 below.

$$k = \begin{bmatrix} 1 & 0 & 2 \\ 0 & 1 & 2 \\ 0 & 2 & 1 \\ 2 & 1 & 1 \\ 0 & 2 & 0 \end{bmatrix} \quad \text{Equation 7}$$

Referring to FIG. 7, a possibility 710 of each quantum state after the process of a quantum state initialization 700 is illustrated. In the same manner as the description of FIG. 5, in the case in which it is assumed that a quantum state that is different from the value of the GCP is referred to as a and quantum states that are the values of GCP are referred to as $\beta_1$ and $\beta_2$, the possibility of each quantum state is identical in the quantum state initialization 700.

FIG. 8 is a diagram illustrating a conditioned oracle operation process, when a quantum calculating center calculates the solution of a GCP using a quantum algorithm that applies a preference according to an embodiment of the disclosure.

Referring to FIG. 8, in a conditioned oracle process 800, a superposed quantum state $$|x\rangle = \frac{1}{\sqrt{2^{N_l \cdot N_c}}} \sum_{0}^{2^{N_l \cdot N_c}-1} |q\rangle$$

and k matrix that are produced via a quantum state initialization process may be received. Subsequently, a conditional determination unit 801 may classify the case that applies a preference and the case that does not apply a preference. The number of times that an algorithm that does not apply a preference and includes a (conditioned) oracle step 800 and an amplitude amplification step 900 is iterated is i (a phase inversion step 1000 is omitted in the case in which a preference is not applied), and the number of times that an algorithm that applies a preference and includes the conditioned oracle step 800, the amplitude amplification step 900, and the phase inversion step 1000 is iterated is $k_l$. The method of determining i,$k_l$ will be described with reference to FIG. 11.

In the case in which the algorithm is not iterated up to i times that is the number of iterations that do not apply a preference, the conditional determining unit 801 may select a quantum state corresponding to the value of the GCP, and may transfer the same to a phase inversion unit 802, irrespective of a k matrix. In the case in which an algorithm is iterated up to i times that is the number of iterations that do not apply a preference, the conditional determining unit 801 may select a quantum state of which the phase is to be inverted by taking into consideration the k matrix that applies a preference, from among quantum states corresponding to the solutions of the GCP, and may transfer the same to the phase inversion unit 802. In this instance, applying a preference may be performed sequentially from the first row to the Nith row of the k matrix. Subsequently, the phase inversion unit 802 may invert the phase of the quantum state that is the object of which the phase is to be inverted and of which the information is received from the conditional determination unit 801, and may output |x'⟩.

Referring to FIG. 8, it is illustrated that a possibility 810 of each quantum state in the case in which a preference is not applied and a possibility 820 of each quantum state in the case in which a preference is applied, after the process of the conditioned oracle 800. In the case in which a preference is not applied, all the phases of $\beta_1$ and $\beta_2$ are not inverted. Conversely, in the case in which a preference is applied, and it is assumed that $\beta_1$ has a higher preference than that of $\beta_2$, only the phase of β1 may be inverted, and the phase of $\beta_2$ may not be inverted even though $\beta_2$ is the value of the GCP.

FIG. 9 is a diagram illustrating an amplitude amplification operation process, when a quantum calculating center calculates the solution of a GCP using a quantum algorithm that applies a preference according to an embodiment of the disclosure.

Referring to FIG. 9, in an amplitude amplification operation process 900, an amplifier 901 may include performing the Hadamard gate operation on |x'⟩ that is received after a conditioned oracle operation process, inverting the phase of a quantum state |0⟩, performing the Hadamard gate operation again, and outputting |x"⟩, as shown in Equation 8 below.

$$HI_0H|x'\rangle = \rangle|x"\rangle \qquad \text{Equation 8}$$

In Equation 8, $I_0$ may be an operator that inverts the phase of the quantum state |0⟩.

Referring to FIG. 9, it is illustrated that a possibility 910 of each quantum state in the case in which a preference is not applied and a possibility 920 of each quantum state in the case in which a preference is applied, after the amplitude amplification process 900. In the amplitude amplification process 900, the phases of both $\beta_1$ and 2 are inverted as shown in Equation 8. In the case in which a preference is not applied, the phases of both $\beta_1$ and $\beta_2$ have positive values. Conversely, in the case in which a preference is applied, the phase of $\beta_1$ has a positive value and the phase of $\beta_2$ has a negative value. Therefore, the phase of $\beta_2$ may need to be inverted again so that the phase of $\beta_2$ has a positive value.

FIG. 10 is a diagram illustrating a phase inversion operation process, when a quantum calculating center calculates the solution of a GCP using a quantum algorithm that applies a preference according to an embodiment of the disclosure.

Referring to FIG. 10, in a phase inversion operation 1000, a conditional determining unit 1001 may select a quantum state of which the phase is not inverted in the conditioned oracle step 800 although the quantum state is the value of the GCP, using the quantum state |x"⟩ obtained via the amplitude amplification process 900 and k matrix obtained via the quantum state initialization process 700, and may transfer the same to a phase inversion unit 1002. Subsequently, the phase inversion unit 1002 may invert the phase of the quantum state that is the object of which the phase is to be inverted and of which information is transferred from the conditional determining unit 1001, and may output |x' "⟩. In the case in which a preference is not applied, in the conditioned oracle step 800, the phases of all quantum states corresponding to the solutions of the GCP are inverted, and thus, they all have positive values after the amplitude amplification step 900. Therefore, in this instance, the phase inversion operation 1000 is omitted.

Referring to FIG. 10, a possibility 1010 of each quantum state before a phase inversion operation 1000 and a possibility 1020 of each quantum state after the phase inversion operation 1000 are illustrated. As illustrated in the above-described example, in the case in which a preference is applied, the phase of $\beta_1$ has a positive value after the amplitude amplification operation 900 and the quantum state $\beta_2$ of which the phase is not inverted in the conditioned oracle 800 may have a negative value after the amplitude amplification operation 900. Therefore, the phase of $\beta_2$ may have a positive value after the phase inversion operation 1000. With reference to the possibility 1020 of each quantum state after the phase inversion operation 1000, $\beta_1$ that has a higher preference (reward or gain) may be amplified to have a higher possibility than that of $\beta_2$ in the case in which a quantum search algorithm that applies a preference is used, unlike a normal quantum search algorithm.

Figure 11:
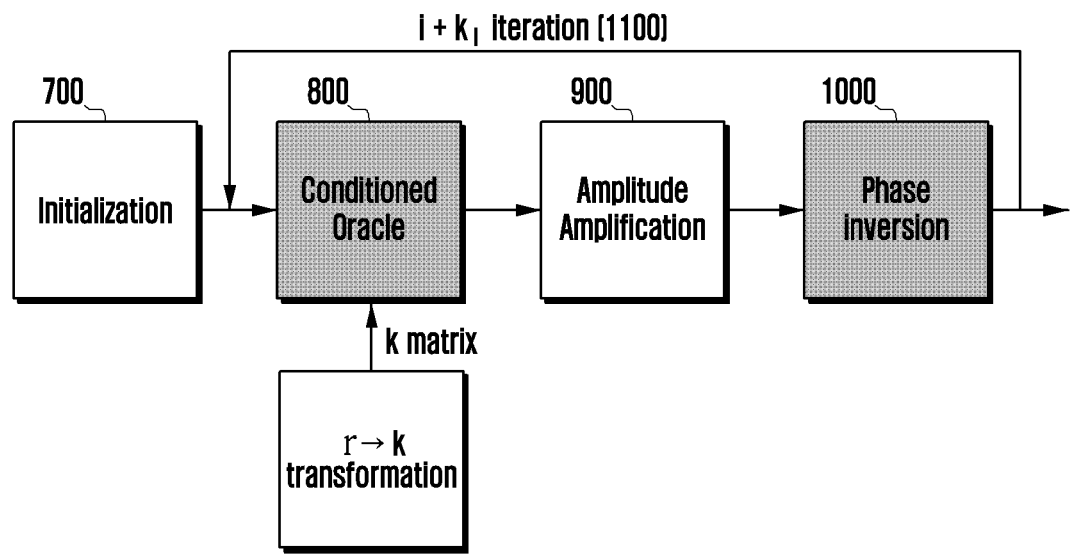
FIG. 11 is a diagram illustrating an operation that iteratively performs an algorithm from a phase conditioned oracle operation to a phase inversion operation, when a quantum calculating center calculates the solution of a GCP using a quantum algorithm that applies a preference according to an embodiment of the disclosure.

FIG. 11 is a diagram illustrating an operation that iteratively performs an algorithm from a conditioned oracle operation to a phase inversion operation, when a quantum calculating center calculates the solution of a GCP using a quantum algorithm that applies a preference according to an embodiment of the disclosure.

Referring to FIG. 11, the number of times that an algorithm that does not apply a preference and includes the (conditioned) oracle step 800 and the amplitude amplification step 900 is iterated is i (the phase inversion step 1000 is omitted in the case in which a preference is not applied), and the number of times that an algorithm that applies a preference and includes the conditioned oracle step 800, the amplitude amplification step 900, and the phase inversion step 1000 is iterated is $k_l$.

In this instance, the minimum number of iterations $i_{min}$ that does not apply a preference may be obtained, and since the maximum number of iterations of a legacy algorithm is known as $\sqrt{N}$, i that satisfies $i_{min} \leq i < \sqrt{N}$ may be selected. Therefore, the algorithm that does not apply a preference and includes the (conditioned) oracle 800 and the amplitude amplification step 900 may be iterated i times. $i_{min}$ may be calculated as shown in Equation 9 below using a k matrix.

$$i_{min} = \sum_{p=1}^{N_l} \left( \max_q k_{pq} - \min_q k_{pq} \right) \qquad \text{Equation 9}$$

In addition, the number k of times that an algorithm that applies a preference is iterated may be calculated using the k matrix, as shown in Equation 10 below.

$$k_l = \sum_{p=1}^{N_l} \max_q k_{pq} \qquad \text{Equation 10}$$

Hereinafter, a process 1100 that iterates an algorithm from a conditioned oracle operation to a phase inversion operation will be described with reference to the above-described example in which $N_l=5$ and $N_c=3$.

In the case in which the k matrix is calculated as shown in Equation 7, $i_{min}$ may be calculated as shown in Equation 11 below.

$$\begin{aligned} i_{min} &= \left( \max_q k_{1q} - \min_q k_{1q} \right) + \left( \max_q k_{2q} - \min_q k_{2q} \right) + \\ &\quad \left( \max_q k_{3q} - \min_q k_{3q} \right) + \left( \max_q k_{4q} - \min_q k_{4q} \right) + \\ &\quad \left( \max_q k_{5q} - \min_q k_{5q} \right) \\ &= (2-0) + (2-0) + (2-1) + (2-0) + (2-0) \\ &= 9 \end{aligned} \qquad \text{Equation 11}$$

Therefore, the algorithm that does not apply a preference and includes the (conditioned) oracle step 800, the amplitude amplification step 900 is iterated at least 9 times, and since then the algorithm that applies a preference and includes the conditioned oracle step 800, the amplitude amplification step 900, and the phase inversion step 1000 is iterated $k_l$ times. In the same manner, in the case in which k matrix is calculated as shown in Equation 7, $k_l$ may be calculated as shown in Equation 12 below.

$$k_l = \max_q k_{1q} + \max_q k_{2q} + \max_q k_{3q} + \max_q k_{4q} + \max_q k_{5q} \quad \text{Equation 12}$$
$$= 2 + 2 + 2 + 2 + 2$$
$$= 10$$

The application of a preference may be sequentially performed from the first row to the $N_l^{th}$ row of the k matrix. Therefore, in the example of Equation 7, the first row of the k matrix is [1 0 2] and thus, in the case in which an algorithm that applies a preference is iterated for the first time, the conditional determining unit 801 in the conditioned oracle process 800 may select a quantum state including $|q_{11}q_{12}q_{13}\rangle=|001\rangle$, and a quantum state including $|q_{11}q_{12}q_{13}\rangle=|001\rangle$, may transfer the same to the phase inversion unit 802, may perform amplitude amplification 900, and may perform phase inversion step 1000, sequentially. Subsequently, in the case in which the algorithm that applies a preference is iterated for the second time, the conditional determining unit 801 in the conditioned oracle process 800 may select a quantum state including $|q_{11}q_{12}q_{13}\rangle=|001\rangle$, may transfer the same to the phase inversion unit 802, and may perform the amplitude amplification 900, and the phase inversion step 1000, sequentially. Subsequently, by sequentially applying the same method, the algorithm including the conditioned oracle step 800, the amplitude amplification step 900, and the phase inversion step 1000 may be iterated up to $k_l$ times. Therefore, by iterating the algorithm i+$k_l$ times, a quantum state |001 010 001 100 010⟩ in the solutions of the GCP may be amplified to have the highest possibility.

Figure 12:
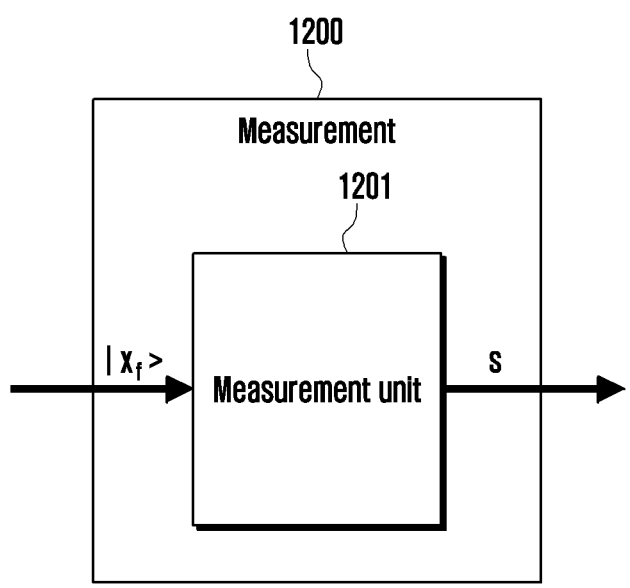
FIG. 12 is a diagram illustrating a measurement process after iteratively performing an algorithm, when a quantum calculating center calculates the solution of a GCP using a quantum algorithm that applies a preference according to an embodiment of the disclosure.

FIG. 12 is a diagram illustrating a measurement process after iteratively performing an algorithm, when a quantum calculating center calculates the solution of a GCP using a quantum algorithm that applies a preference according to an embodiment of the disclosure.

Referring to FIG. 12, a quantum state $|x_f\rangle$ finally obtained after iterating, i+$k_l$ times, a quantum algorithm that applies a preference according to the above-described method may be measured in a measurement process 1200 performed by a measurement unit 1201, and a single index s may be obtained. The index s may be obtained based on the possibility of each of the quantum states of $|x_f\rangle$. For example, the index s may be obtained as a legacy bit. The detailed process of the measurement process 1200 is different depending on a quantum state, and a predetermined quantum platform is not assumed in the disclosure.

Figure 13:
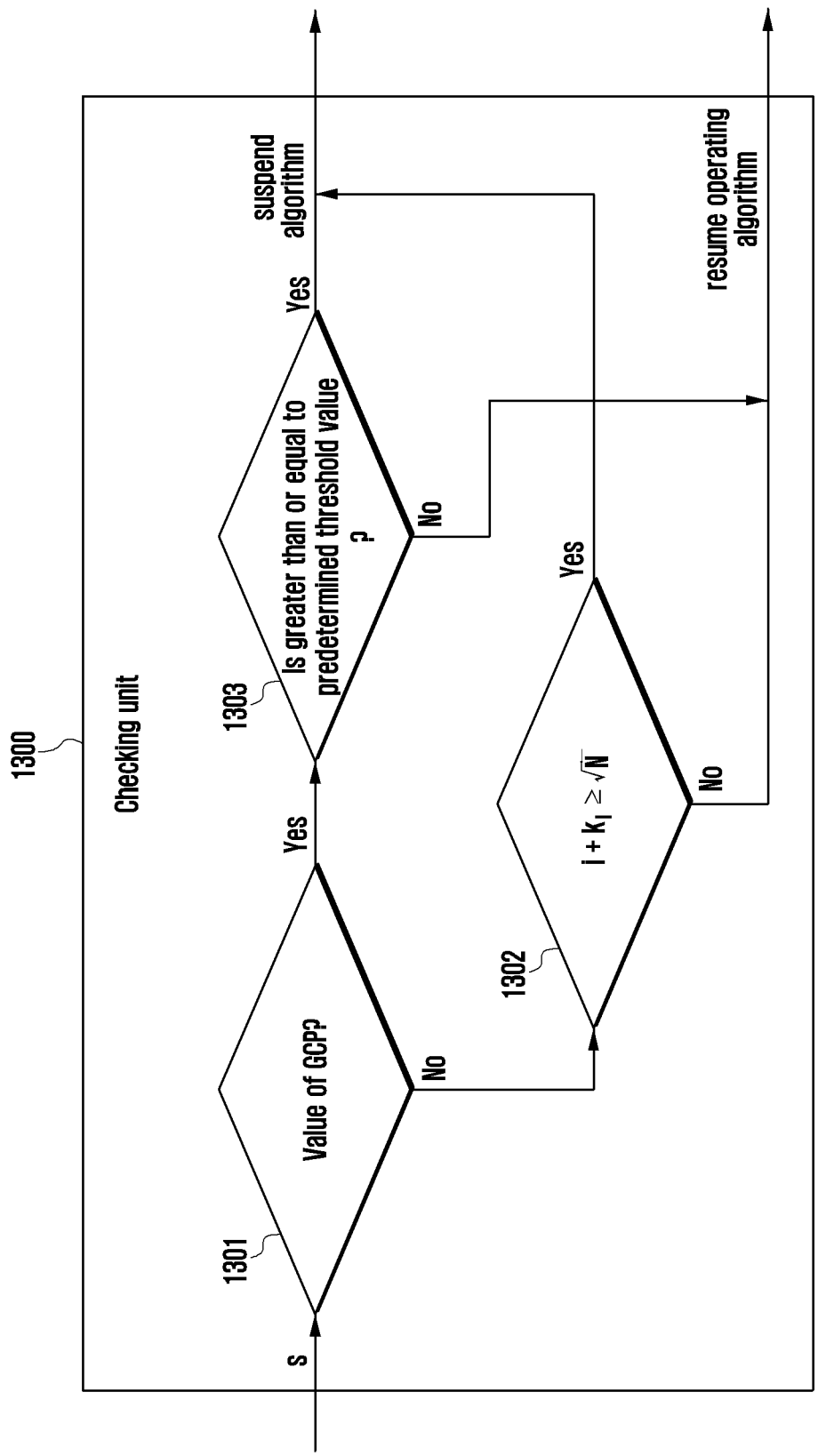
FIG. 13 is a diagram illustrating a process of operating a checking unit, when a quantum calculating center calculates the solution of a GCP using a quantum algorithm that applies a preference according to an embodiment of the disclosure.

FIG. 13 is a diagram illustrating a process of operating a checking unit, when a quantum calculating center calculates the solution of a GCP using a quantum algorithm that applies a preference according to an embodiment of the disclosure.

Referring to FIG. 13, a checking unit 1300 may resume or suspend performing an algorithm, in association with the index s obtained in the measurement process 1200 and the number i+$k_l$ of times that the algorithm is iterated.

For example, the checking unit 1300 may determine whether the index s is the value of the GCP in operation 1301. In the case in which the index s is not the value of the GCP, whether i+$k_l \geq \sqrt{N}$ that is the number of times that the algorithm is iterated (whether the number of iterations reaches the maximum number of iterations) is satisfied is determined in operation 1302. In the case in which i+$k_l \geq \sqrt{N}$ is not satisfied (in the case in which the number of iterations does not reach the maximum number of iterations), an algorithm may be resumed by increasing the number i of iterations that do not apply a preference. In this instance, the method of increasing i may comply with, for example, a BBHT algorithm. In the case in which i+$k_l \geq \sqrt{N}$ is satisfied (the number of iterations reaches the maximum number of iterations), the algorithm may be suspended, and retransmission of information associated with at least one of a graph, a color, and a reward matrix may be requested from a transmitter (base station). In the case in which the result of the determination in operation 1301 on whether the index s is the value of the GCP is the value of the GCP, it is determined whether a reward (gain) of the index s is greater than or equal to a predetermined threshold value in operation 1303. In the case in which the reward (gain) of the index s is less than the predetermined threshold value, the algorithm may be resumed by changing the k matrix. In this instance, as the scheme of changing the k matrix, a scheme of multiplying the k matrix by a predetermined natural number may be used. In the case in which the reward (gain) of the index s is greater than or equal to the predetermined threshold, the index s (or resource allocation information corresponding to the index s) may be transmitted to a transmitter (base station).

In the case in which a quantum calculating center transmits the index s (or resource allocation information corresponding to the index s) to the transmitter (base station), the transmitter (base station) may allocate a resource of a communication system based on the received information. Referring to FIG. 4, for example, in the case in which the index s is obtained as (001 010 001 100 010), the base station may allocate a resource [$s_3, s_2, s_3, s_1, s_2$] to a UE [$u_1, u_2, u_3, u_4, u_5$], respectively.

In the case in which the quantum calculating center requests retransmission of information from the transmitter (base station), the transmitter (base station) may report whether resource allocation fails to a UE that joins to configure a reward matrix. Alternatively, in consideration of the number of attempts performed until a desired resource is allocated, the base station may request retransmission from some of the UEs that join to configure the reward matrix. The base station may configure the reward matrix based on whether resource allocation that desires a retransmitted reward (gain) value is attempted or the like. A UE that receives a retransmission request may transmit a previous reward (gain) value again, or may transmit a changed reward (gain) value. For example, in the case in which resources that UE $u_1$ desires are $s_1$ and $s_2$, and a reward (gain) value for the resource $s_1$ has been transmitted, the UE $u_1$ may transmit a reward (gain) value associated with the resource $s_2$ after receiving a retransmission request. Therefore, in the case in which the UE transmits a reward (gain) value to the base station, a signal indicating that a previous reward (gain) value is to be continuously used may be included. For example, in the case in which the reward (gain) value is expressed as 2 bits, a reward (gain) value of 00, 01, or 10 may be transmitted, 11 may indicate the case of using a previous reward (gain) value.

Figure 14:
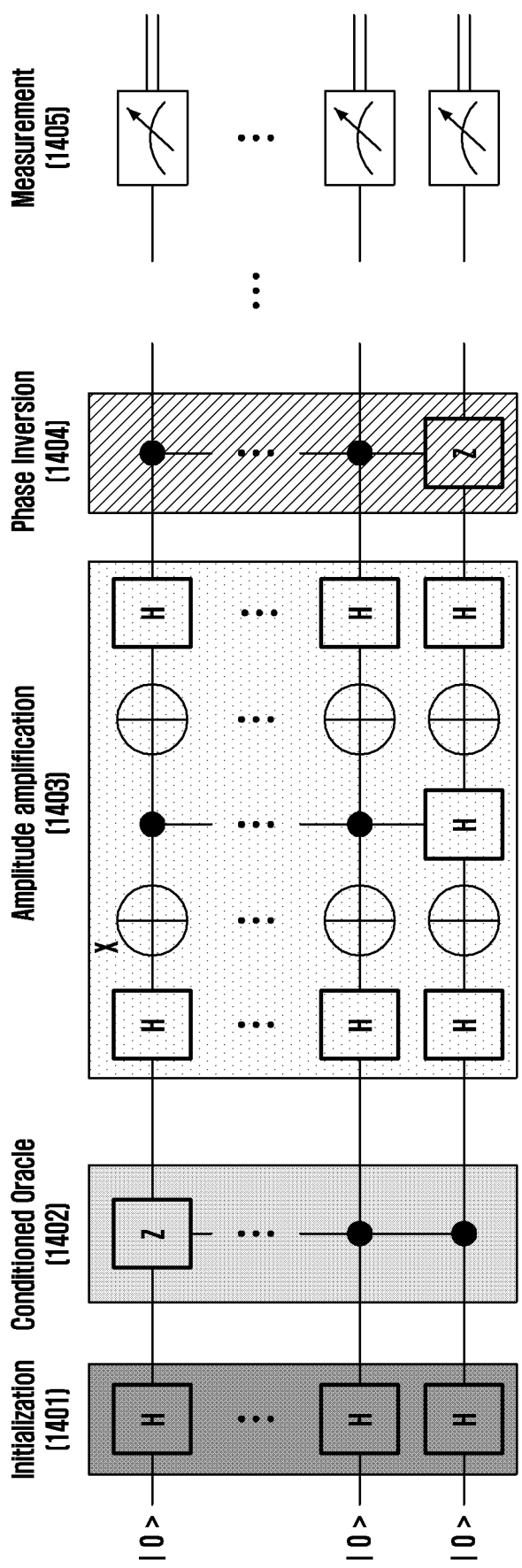
FIG. 14 is a diagram illustrating an example of the configuration of a circuit for implementing a quantum algorithm that applies a preference according to an embodiment of the disclosure.

FIG. 14 is a diagram illustrating an example of the configuration of a circuit for implementing a quantum algorithm that applies a preference according to an embodiment of the disclosure.

Referring to FIG. 14, a total of $N_l \times N_c$ qubits in the |0⟩ state may be assigned for a quantum state initialization operation 1401. The qubit in the |0⟩ state may correspond to a superposed quantum state in which all allocation combinations that do not take into consideration existence of a connection are superposed using the Hadamard gate. Subsequently, for a conditioned oracle operation 1402, the phase of a desired quantum state may be inverted to a Z gate in consideration of whether a preference is to be applied. Subsequently, for an amplitude amplification operation 1403, the Hadamard gate operation and an operation of inverting the phase in the |0⟩ state may be performed, and the Hadamard gate operation may be performed again. Subsequently, for the phase inversion operation 1404, the phase of the target quantum state may be inverted into the Z gate by taking into consideration whether a preference is to be applied. For example, even though it is the value of the GCP, the phase of a quantum state that was not inverted in the conditioned oracle operation 1402 may be inverted. Subsequently, a single index may be obtained via quantum state measurement 1405.

Figure 15:
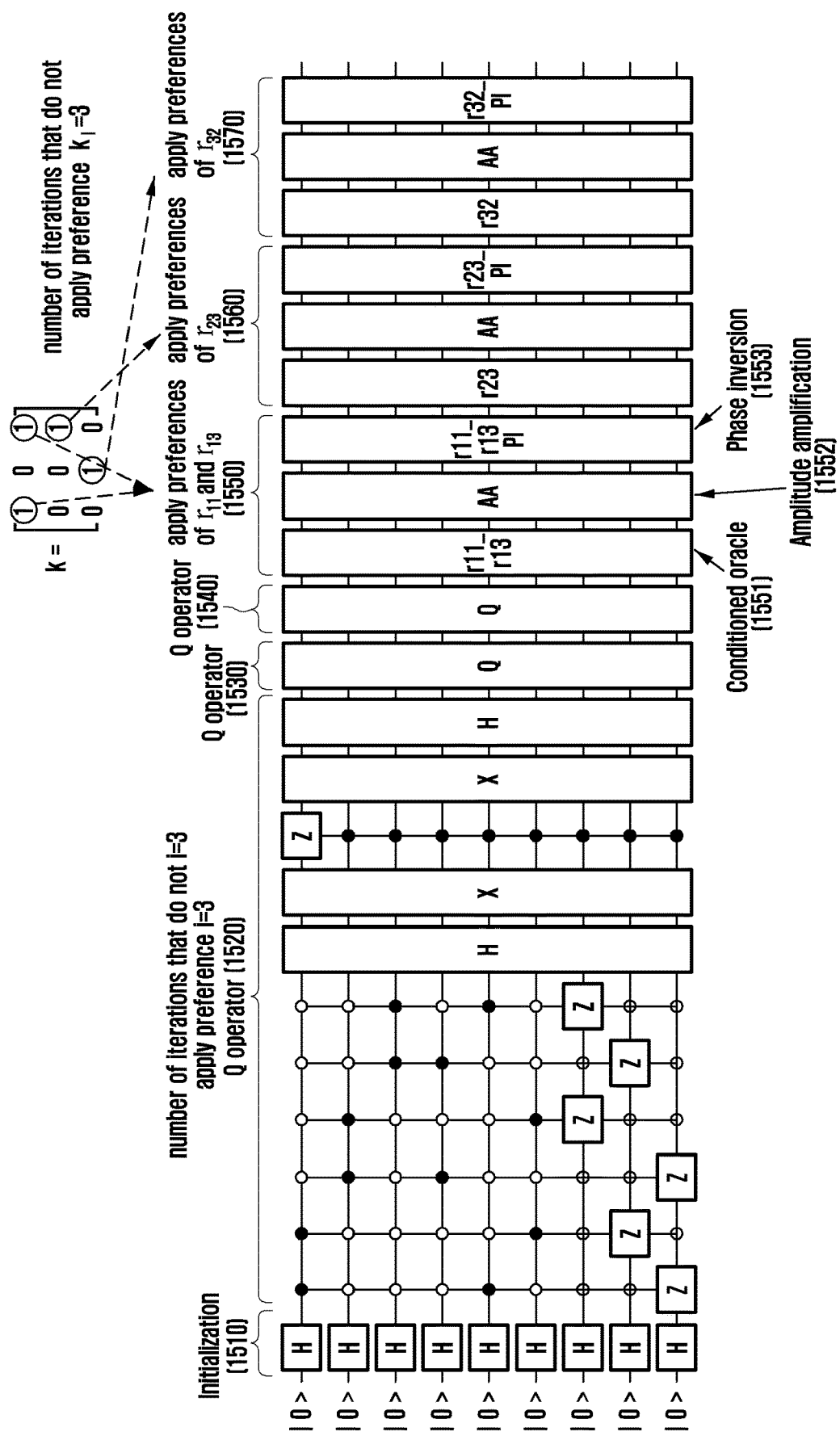
FIG. 15 is a diagram illustrating an example of a circuit design when a quantum algorithm that applies a preference is iteratively performed according to an embodiment of the disclosure.

FIG. 15 is a diagram illustrating an example of a circuit design when a quantum algorithm that applies a preference is iteratively performed according to an embodiment of the disclosure.

In diagram, for ease of description, it is assumed that $N_f=3$, $N_c=3$, the number of iterations that do not apply a preference is i=3, and a k matrix is [1 0 1; 0 01; 0 1 0].

Referring to FIG. 15, for a quantum state initialization operation 1510, a total of 9 qubits in the |0⟩ state may be assigned. Q operators 1520, 1530, and 1540 that implement a quantum algorithm that does not apply a preference may perform a normal oracle step and amplitude amplification step, and may iteratively perform the same a total of 3 times. Subsequently, a circuit 1550 that applies preferences of $r_{11}$ and $r_{13}$ and that implements conditioned oracle 1551, amplitude amplification 1552, and phase inversion 1553 may be included. Subsequently, a circuit 1560, 1570 that implements a quantum algorithm that applies a preference of $r_{23}$ and implements a quantum algorithm that applies a preference of $r_{32}$ may be included. That is, a quantum algorithm that does not apply a preference may be iterated $k_f=3$ times.

Figure 16:
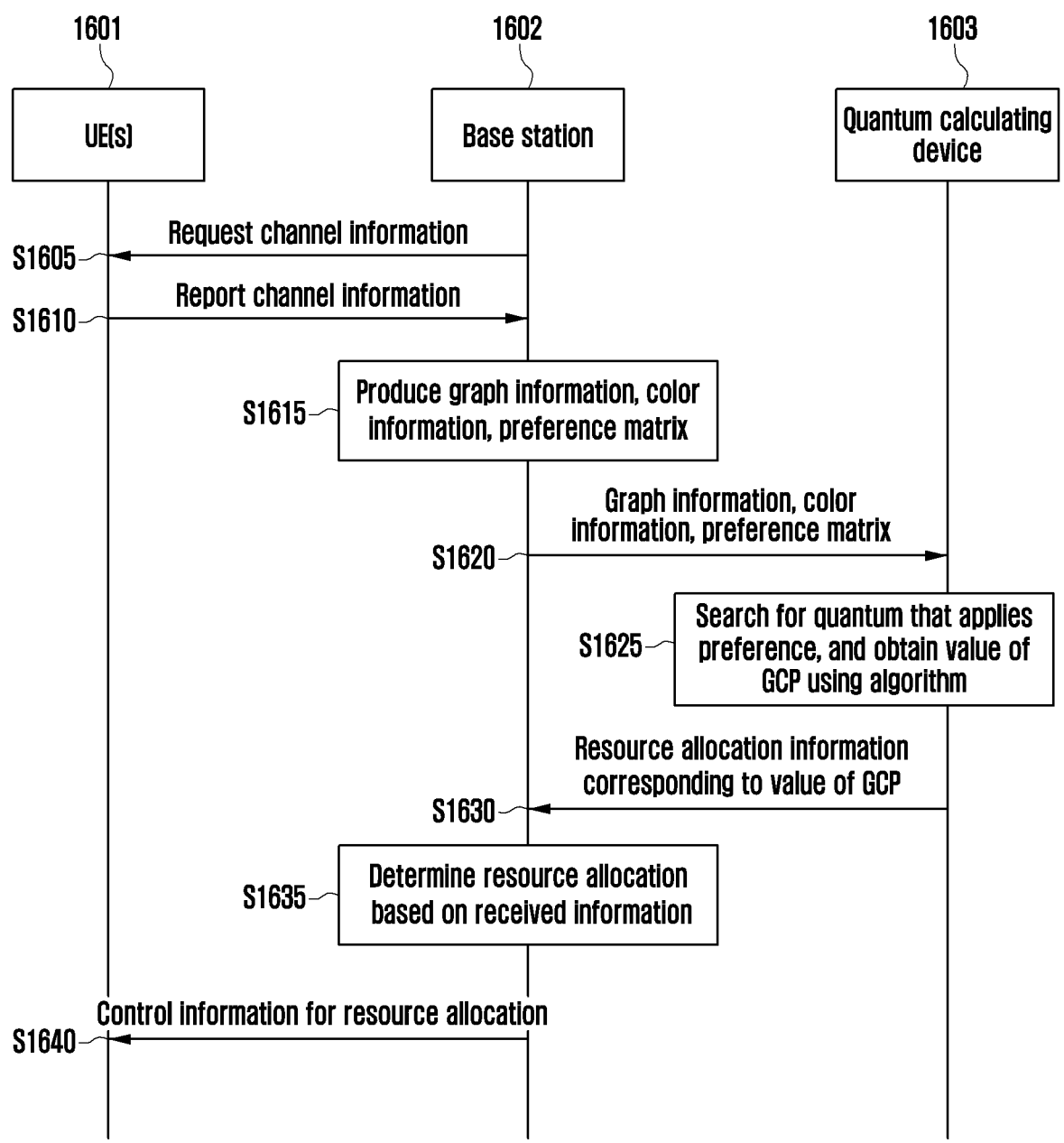
FIG. 16 is a sequence diagram illustrating a resource allocation method that applies a preference according to an embodiment of the disclosure.

FIG. 16 is a sequence diagram illustrating a resource allocation method that applies a preference according to an embodiment of the disclosure.

Referring to FIG. 16, a base station 1602 may request channel information from a UE 1601 in operation S1605. For example, the channel information may be information indicating a reward (gain) that may be obtained by allocating a resource to the UE 1601. In this instance, the reward (gain) may be the maximum bandwidth or throughput, or the like that an object (a UE) that receives a resource allocated is capable of obtaining when using an allocated resource spectrum. Alternatively, for example, the base station 1602 may transmit, to the UE 1601, information that requests a CQI value.

The UE 1601 may report, to the base station 1602, channel information that the base station 1602 requests in operation S1610. For example, the UE 1601 may transmit a CQI value to the base station 1602. Alternatively, according to an embodiment, the UE 1601 may periodically transmit a CQI value to the base station 1602, and in this instance, operation S1605 may be omitted.

In operation S1615, the base station 1602 may produce a graph, color information, and reward matrix information for applying a preference, based on the channel information received from the UE 1601. For example, based on the channel information received from the UE 1601, the base station 1602 may produce graph information by corresponding UEs that are to receive allocated resources to a plurality of vertexes, and by corresponding an edge to UEs that interfere with each other. In addition, the base station 1602 may produce color information based on an allocable resource. In this instance, the number of allocable resources may be the number of available colors. In addition, the base station 1602 may produce reward matrix information indicating a communication reward (gain) when a corresponding resource is allocated to each UE 1601.

In operation S1620, the base station 1602 may transmit the produced graph, color information, and reward matrix information for applying a preference, to a quantum calculating device 1603.

In operation S1625, the quantum calculating device 1603 may operate a quantum search algorithm that applies a preference based on the information received from the base station 1602, and may obtain the solution of a GCP. The quantum search algorithm that applies a preference may include a quantum state initialization process, a conditioned oracle process, an amplitude amplification process, a phase inversion process, an iteration process, and a measurement process, and detailed descriptions thereof have been described.

The quantum calculating device 1603 may transmit resource allocation information corresponding to the value of the GCP in operation S1630. Alternatively, retransmission of information may be requested from the base station 1602. In the case in which the base station 1602 receives a request for retransmission of information from the quantum calculating device 1603, the base station 1602 may produce, again, at least one of a graph, color information, and reward matrix information for applying a preference and may transmit the same to the quantum calculating device 1603.

In operation S1635, the base station 1602 may allocate a resource to the UE 1601 based on the resource allocation information received from the quantum calculating device 1603. For example, which resource is to be allocated to which UE may be determined based on the received resource allocation information.

In operation S1640, the base station 1602 may transmit control information for resource allocation (e.g., downlink control information (DCI)) to the UE 1601.

It is not that all the described steps are necessarily included and some steps can be omitted depending on a configuration and/or definition or the like in a system. For ease of description, although a base station and a quantum calculating device are described as separate entities, the operation of the base station and the quantum calculating device may be performed in a single physical entity.

Figure 17:
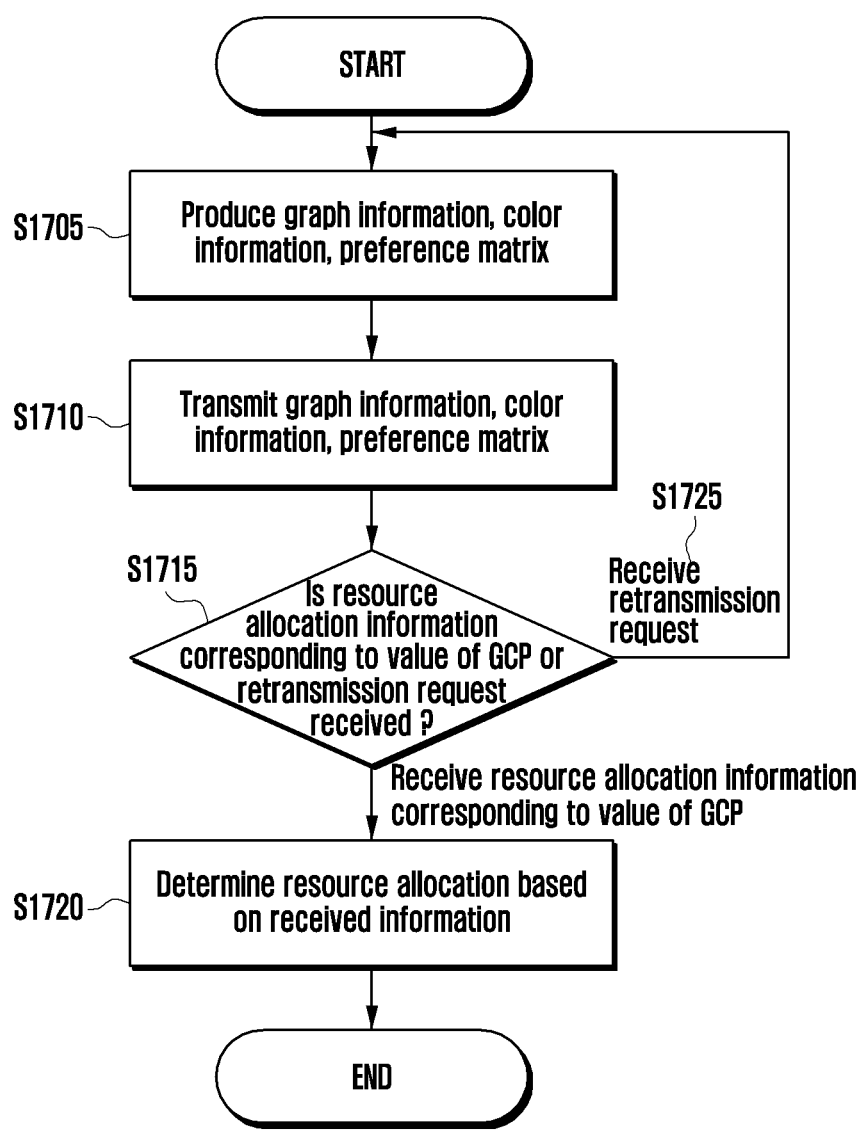
FIG. 17 is a flowchart illustrating the operation of a base station in a resource allocation method that applies a preference according to an embodiment of the disclosure.

FIG. 17 is a flowchart illustrating the operation of a base station in a resource allocation method that applies a preference according to an embodiment of the disclosure.

Referring to FIG. 17, in operation S1705, a base station may produce a graph, color information, and reward matrix information to apply a preference based on channel information (e.g., CQI) received from the UE. For example, based on the channel information received from the UE, the base station may produce graph information by corresponding UEs that are to receive allocated resources to a plurality of vertexes, and by corresponding an edge to UEs that interfere with each other. In addition, the base station may produce color information based on an allocable resource. In this instance, the number of allocable resources may be the number of available colors. In addition, the base station may produce reward matrix information indicating a communication reward (gain) when a corresponding resource is allocated to each UE.

In operation S1710, the base station may transmit the produced graph, color information, and reward matrix information for applying a preference to a quantum calculating device in operation 1710. The graph, color information, and reward matrix information for applying a preference transmitted to the quantum calculating device may be used for a quantum search algorithm that applies a preference in the quantum calculating device.

In operation S1715, the base station may receive resource allocation information from the quantum calculating device, or may receive a request for retransmission of information from the quantum calculating device. In this instance, the resource allocation information may be the value of the GCP calculated by the quantum calculating device, and may be obtained as a result of operating the quantum search algorithm that applies a preference.

In the case in which the resource allocation information is received from the quantum calculating device, the base station may allocate a resource to the UE based on the received resource allocation information in operation S1720. For example, which resource is to be allocated to which UE may be determined based on the received resource allocation information.

In the case in which the request for retransmission of information is received from the quantum calculating device, the base station may produce, again, at least one of a graph, color information, and reward matrix information for applying a preference and may transmit the same to the quantum calculating device in operation S1725.

It is not that all the described steps are necessarily included and some steps can be omitted depending on a configuration and/or definition or the like in a system.

Figure 18:
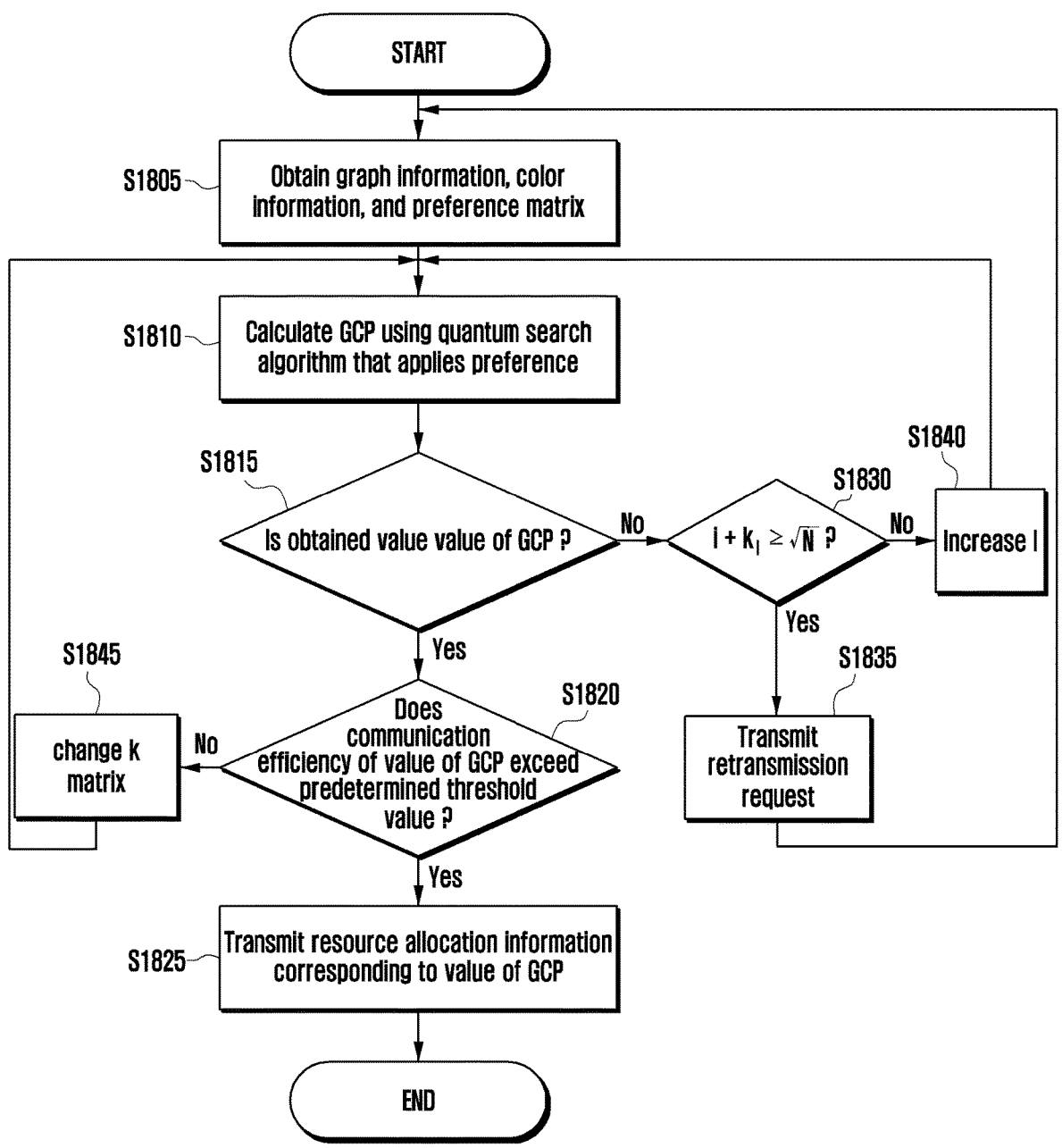
FIG. 18 is a flowchart illustrating the operation of a quantum calculating device in a resource allocation method that applies a preference according to an embodiment of the disclosure.

FIG. 18 is a flowchart illustrating the operation of a quantum calculating device in a resource allocation method that applies a preference according to an embodiment of the disclosure.

Referring to FIG. 18, in operation S1805, a quantum calculating device may obtain a graph, color information, and reward matrix information for applying a preference. For example, the information may be received from a base station.

In operation S1810, the quantum calculating device may operate a quantum search algorithm that applies a preference based on the obtained graph, color information and reward matrix information for applying a preference, and may obtain the solution of a GCP. The quantum search algorithm that applies a preference may include a quantum state initialization process, a conditioned oracle process, an amplitude amplification process, a phase inversion process, an iteration process, and a measurement process, and detailed descriptions thereof have been described.

In operation S1815, the quantum calculating device may determine whether a value obtained by operating the quantum search algorithm that applies a preference is the value of the GCP.

In the case in which the obtained value is the value of the GCP, the quantum calculating device may determine whether the reward (gain) value of an index (or resource allocation information) corresponding to the value of the GCP exceeds a predetermined threshold value in operation S1820. For example, the reward (gain) value may be communication efficiency obtained when resource allocation to a UE is performed based on the index (or resource allocation information).

In the case in which the reward (gain) value of the index (or resource allocation information) corresponding to the value of the GCP exceeds a predetermined threshold value, the quantum calculating device may transmit the index (or resource allocation information) corresponding to the value of the GCP to the base station in operation S1825.

In the case in which the obtained value is not the value of the GCP, the quantum calculating device may determine whether the number of iterations $i+k_j \geq \sqrt{N}$ of an algorithm is satisfied (whether the number of iterations reaches the maximum number of iterations) in operation S1830.

In the case in which $i+k_j \geq \sqrt{N}$ is satisfied (in the case in which the number of iterations reaches the maximum number of iterations), the quantum calculating device may request, from the base station, retransmission of information associated with at least one of a graph, a color, a reward matrix in operation S1835.

In the case in which $i+k_j \geq \sqrt{N}$ is not satisfied (in the case in which the number of iterations does not reach the maximum number of iterations), the quantum calculating device may resume operating of the algorithm by increasing the number of iterations i that does not apply a preference in operation S1840.

In the case in which the reward (gain) value of the index (or the resource allocation information) corresponding to the value of the GCP does not exceed a predetermined threshold value, the quantum calculating device may operate an algorithm by changing a k matrix in operation S1845. As the scheme of changing the k matrix, a scheme of multiplying the k matrix by a predetermined natural number may be used.

It is not that all the described steps are necessarily included and some steps can be omitted depending on a configuration and/or definition or the like in a system.

Figure 19:
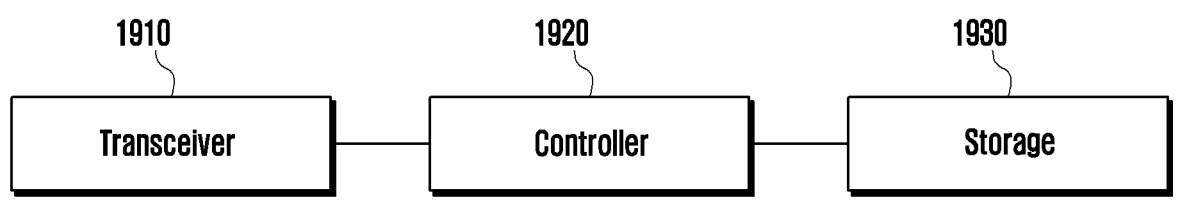
FIG. 19 is a diagram illustrating the structure of a base station according to an embodiment.

FIG. 19 is a diagram illustrating the structure of a base station according to an embodiment.

Referring to FIG. 19, a base station may include a transceiver 1910, a controller 1920, and a storage 1930. In the disclosure, the controller may be defined as a circuit, an application-specified integrated circuit, or at least one processor.

The transceiver 1910 may perform signal transmission or reception with another network entity. For example, the transceiver 1910 may transmit system information to a UE, and may transmit a synchronization signal or a reference signal. Alternatively, for example, the transceiver 1910 may transmit a signal for requesting channel information to the UE, and may receive channel information from the UE. Alternatively, for example, the transceiver 1910 may perform signal transmission or reception with a quantum calculating device. Alternatively, for example, the transceiver 1910 may transmit information associated with a graph, a color, a reward matrix to the quantum calculating device, and may receive information related to resource allocation from the quantum calculating device.

The controller 1920 may control the overall operation of the base station according to the embodiments of the disclosure. For example, the controller 1920 may control a signal flow between blocks so that operations based on the above-described flowcharts are performed. Alternatively, for example, the controller 1920 may produce a graph, color information, and reward matrix information to apply a preference based on channel information (e.g., CQI) received from the UE. In addition, in the case in which the resource allocation information is received from the quantum calculating device, the controller 1920 may allocate a resource to the UE based on the received resource allocation information in operation S1920. Alternatively, for example, the controller 1920 may determine which resource is to be allocated to which UE based on the received resource allocation information. Alternatively, in the case in which a request for retransmission of information is received from the quantum calculating device, the controller 1920 may produce again at least one of a graph, color information, and reward matrix information for applying a preference.

The storage 1930 may store at least one piece of information among information transmitted or received via the transceiver 1910 and information produced by the controller 1920.

Figure 20:
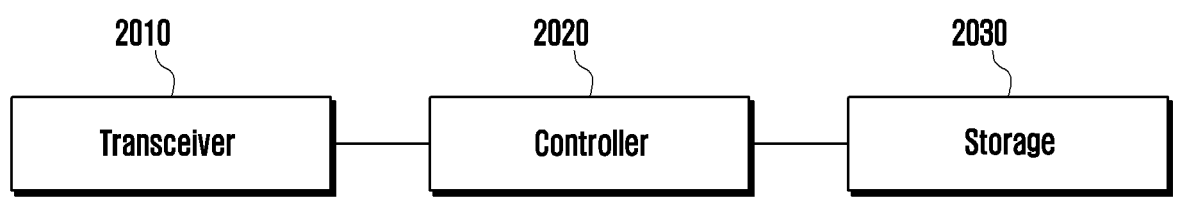
FIG. 20 is a diagram illustrating the structure of a quantum calculating device according to an embodiment of the disclosure.

FIG. 20 is a diagram illustrating the structure of a quantum calculating device according to an embodiment of the disclosure.

Referring to FIG. 20, the quantum calculating device may include a transceiver 2010, a controller 2020, and a storage 2030. In the disclosure, the controller may be defined as a circuit, an application-specified integrated circuit, or at least one processor.

The transceiver 2010 may perform signal transmission or reception with another network entity. For example, the transceiver 2010 may receive information associated with a graph, a color, and a reward matrix from a base station. Alternatively, for example, the transceiver 2010 may transmit information related to resource allocation to the base station, or may transmit a request for retransmission of the information to the base station. Alternatively, for example, the transceiver 2010 may receive, from the base station, first information related to interference between a plurality of UEs that are to receive resources allocated, second information related to the number of available resources, and third information related to a resource allocation reward (gain) associated with each of the plurality of UEs.

The controller 2020 may control the overall operation of the quantum calculating device according to the embodiments of the disclosure. For example, the controller 2020 may control a signal flow between blocks so that operations based on the above-described flowcharts are performed. Alternatively, for example, the controller 2020 may operate a quantum search algorithm that applies a preference based on a graph, color information and reward matrix information for applying a preference, and may obtain the solution of a GCP. Alternatively, for example, the controller 2020 may select a plurality of qubits based on the first information and the second information, and may produce resource allocation information obtained from the plurality of qubits based on the third information. Here, resources may be allocated to the plurality of UEs based on the resource allocation information.

The storage 2030 may store at least one piece of information among information transmitted or received via the transceiver 2010 and information produced by the controller 2020.

For ease of description, although the case in which a single link for a single UE and a single base station corresponds to a single resource has been considered, a single node may be regarded as a group including a plurality of links. That is, when a node includes a large number of links, a large number of resources may be allocated. Even in the case of using an uplink/downlink resource together such as full duplex radio, the disclosure may be applied by performing conversion to a GCP that takes into consideration interference between resources. For ease of description, although a base station and a quantum calculating device are described as separate entities, the operation of the base station and the quantum calculating device may be performed in a single physical entity.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an apparatus of a wireless communication system, the method comprising:
   receiving, from a base station, first information on interference among a plurality of terminals that are to receive a resource allocation from the base station, second information on a number of resources available for the plurality of terminals, and third information on a reward matrix indicating a resource preference for the plurality of terminals;
   identifying a plurality of qubits based on the first information and the second information;
   generating a preference matrix based on the reward matrix, the preference matrix indicating an iteration number of a quantum search algorithm with preference and being applied for each qubit of the plurality of qubits;
   selecting a quantum state from a superposed quantum state of the plurality of qubits, based on the quantum search algorithm with preference and the preference matrix;
   generating resource allocation information based on a measurement of the selected quantum state;
   determining whether a reward value corresponding to the resource allocation information exceeds a predetermined threshold value;
   in response to the reward value not exceeding the predetermined threshold value, resuming the quantum search algorithm by multiplying a natural number to the preference matrix; and
   in response to the reward value exceeding the predetermined threshold value, transmitting, to the base station, the resource allocation information.

2. The method of claim 1, wherein a number of the plurality of qubits is a product of a number of the plurality of terminals and a number of the available resources.

3. The method of claim 1, wherein a selection of the quantum state from the superposed quantum state further comprises:
   amplifying a detection possibility of a first quantum state by iterating a first algorithm without preference, the first quantum state corresponding to a resource allocation without the interference; and
   amplifying a detection possibility of a second quantum state by iterating a second algorithm with preference, the second quantum state corresponding to a resource allocation with the resource preference,
   wherein the quantum state is selected after an amplification of the detection possibility of the second quantum state.

4. The method of claim 3, further comprising:
   determining a first iteration number for the first algorithm and a second iteration number for the second algorithm based on the preference matrix.

5. The method of claim 3, further comprising:
   determining whether the resource allocation information indicates a resource allocation with the interference,
   in response to the resource allocation information indicating the resource allocation with the interference, identifying whether a sum of a first iteration number and a second iteration number reaches a maximum value, wherein, in response to the resource allocation information indicating the resource allocation without the interference, whether the reward value exceeds the predetermined threshold value is determined, and wherein the maximum value corresponds to a square root of a number of the superposed quantum state.

6. The method of claim 5, further comprising:

in response to an identification that the total iteration number reaches the maximum value, transmitting, to the base station, a request for a retransmission of the third information; and receiving, from the base station, a response for the retransmission of the third information with another reward different from the reward.

7. The method of claim 5, further comprising:

in response to an identification that the sum of a first iteration number and a second iteration number does not reach the maximum value,, increasing the first iteration number.

8. An apparatus of a wireless communication system, the apparatus comprising:

a transceiver; and a controller configured to:

receive, from a base station via the transceiver, first information on interference among a plurality of terminals that are to receive a resource allocation from the base station, second information on a number of resources available for the plurality of UEs terminals, and third information on a reward matrix indicating a resource preference for the plurality of terminals, identify a plurality of qubits based on the first information and the second information, generate a preference matrix based on the reward matrix, the preference matrix indicating an iteration number of a quantum search algorithm with preference and being applied for each qubit of the plurality of qubits, select a quantum state from a superposed quantum state of the plurality of qubits, based on the quantum search algorithm with preference and the preference matrix, generate resource allocation information based on a measurement of the selected quantum state, determine whether a reward value corresponding to the resource allocation information exceeds a predetermined threshold value, in response to the reward value not exceeding the predetermined threshold value, resume the quantum search algorithm by multiplying a natural number to the preference matrix, and in response to the reward value exceeding the predetermined threshold value, transmit, to the base station via the transceiver, the resource allocation information.

9. The apparatus of claim 8, wherein a number of the plurality of qubits is a product of a number of the plurality of terminals and a number of the available resources.

10. The apparatus of claim 8, wherein the controller is further configured to:

amplify a detection possibility of a first quantum state by iterating a first algorithm without preference, the first quantum state corresponding to a resource allocation without the interference, and amplify a detection possibility of a second quantum state by iterating a second algorithm with preference, the second quantum state corresponding to a resource allocation with the resource preference, and wherein the quantum state is selected after an amplification of the detection possibility of the second quantum state.

11. The apparatus of claim 10, wherein the controller is further configured to determine a first iteration number for the first algorithm and a second iteration number for the second algorithm based on the preference matrix.

12. The apparatus of claim 10, wherein the controller is further configured to:

determine whether the resource allocation information indicates a resource allocation with the interference, and in response to the resource allocation information indicating the resource allocation with the interference, identify whether a sum of a first iteration number and a second iteration number reaches a maximum value, wherein, in response to the resource allocation information indicating the resource allocation without the interference, whether the reward value exceeds the predetermined threshold value is determined, and wherein the maximum value corresponds to a square root of a number of the superposed quantum state.

13. The apparatus of claim 12, wherein the controller is further configured to:

in response to an identification that the total iteration number reaches the maximum value, transmit, to the base station via the transceiver, a request for a retransmission of the third information, and receive, from the base station via the transceiver, a response for the retransmission of the third information with another reward different from the reward.

14. The apparatus of claim 12, wherein the controller is further configured to, in response to an identification that the sum of a first iteration number and a second iteration number does not reach the maximum value, increase the first iteration number.

* * * * *